US008553176B2

(12) United States Patent
Matsui et al.

(10) Patent No.: US 8,553,176 B2
(45) Date of Patent: Oct. 8, 2013

(54) LIQUID CRYSTAL DISPLAY DEVICE

(71) Applicants: Yoshitaka Matsui, Osaka (JP); Yoshiyuki Kawagoe, Osaka (JP)

(72) Inventors: Yoshitaka Matsui, Osaka (JP); Yoshiyuki Kawagoe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/720,807

(22) Filed: Dec. 19, 2012

(65) Prior Publication Data

US 2013/0106924 A1 May 2, 2013

Related U.S. Application Data

(62) Division of application No. 13/500,812, filed as application No. PCT/JP2010/067357 on Oct. 4, 2010, now Pat. No. 8,363,180.

(30) Foreign Application Priority Data

Oct. 7, 2009 (JP) ................................ 2009-233386
Oct. 13, 2009 (JP) ................................ 2009-235925
Apr. 6, 2010 (JP) ................................ 2010-087506
Apr. 12, 2010 (JP) ................................ 2010-091530

(51) Int. Cl.
*G02F 1/1335* (2006.01)

(52) U.S. Cl.
USPC .................. 349/61; 349/56; 349/62; 349/63; 349/127

(58) Field of Classification Search
USPC ................................ 349/56, 61, 62, 63, 127
See application file for complete search history.

(56) References Cited

U.S. PATENT DOCUMENTS 7,746,007 B2 * 6/2010 Cauffield ...................... 315/307
(Continued)

FOREIGN PATENT DOCUMENTS

EP 1 748 412 A2 1/2007
JP 2000-163019 A 6/2000
(Continued)

OTHER PUBLICATIONS

Supplementary European Search Report for corresponding European Application No. 10821960.1, dated Feb. 5, 2013.

*Primary Examiner* — Jennifer Doan
(74) *Attorney, Agent, or Firm* — Birch, Stewart, Kolasch & Birch, LLP

(57) ABSTRACT

A liquid crystal display device performs suitable overshoot drive, even if a panel temperature is changed due to a change of the backlight emission luminance. The liquid crystal display device includes: a temperature sensor which detects the temperature in the device; an emphasis conversion section, which obtains, after the elapse of one vertical display period, an emphasis conversion parameter for making the transmissivity of the liquid crystal panel reach the transmissivity specified by input image signals, and which outputs applying voltage signals for the liquid crystal panel on the basis of the emphasis conversion parameter; and a main microcomputer which corrects the panel temperature of the liquid crystal panel on the basis of the changed light emission luminance when the light emission luminance of the backlight is changed. The emphasis conversion section variably controls the emphasis conversion parameter on the basis of the panel temperature corrected via the main microcomputer.

7 Claims, 15 Drawing Sheets

(56) References Cited

U.S. PATENT DOCUMENTS

| | | | | |
|---|---|---|---|---|
| 7,804,547 | B2 * | 9/2010 | Teranishi | 348/751 |
| 8,008,863 | B2 | 8/2011 | Chiang et al. | |
| 8,194,203 | B2 | 6/2012 | Sekiguchi et al. | |
| 2004/0201564 | A1 | 10/2004 | Sugino et al. | |
| 2006/0071894 | A1 | 4/2006 | Sugawara et al. | |
| 2006/0158415 | A1 | 7/2006 | Izumi | |
| 2006/0273742 | A1 | 12/2006 | Kim et al. | |
| 2007/0024563 | A1 | 2/2007 | Oura | |
| 2007/0075951 | A1 | 4/2007 | Lin et al. | |
| 2008/0284775 | A1 | 11/2008 | Shen et al. | |

FOREIGN PATENT DOCUMENTS

| | | | |
|---|---|---|---|
| JP | 2001-134242 | A | 5/2001 |
| JP | 2004-151672 | A | 5/2004 |
| JP | 2004-272050 | A | 9/2004 |
| JP | 2004-317623 | A | 11/2004 |
| JP | 2005-338266 | A | 12/2005 |
| JP | 2006-195231 | A | 7/2006 |
| JP | 2007-240666 | A | 9/2007 |
| JP | 2008-185932 | A | 8/2008 |
| JP | 2010-262240 | A | 11/2010 |
| RU | 63073 | U1 | 5/2007 |

* cited by examiner

FIG. 3

CURRENT FRAME DATA

PRECEDING FRAME DATA

| | 0 | 32 | 64 | 96 | 128 | 160 | 192 | 224 | 255 |
|---|---|---|---|---|---|---|---|---|---|
| 0 | 0 | 51 | 118 | 165 | 194 | 214 | 230 | 242 | 255 |
| 32 | 0 | 32 | 94 | 142 | 177 | 202 | 224 | 239 | 255 |
| 64 | 0 | 12 | 64 | 110 | 150 | 182 | 209 | 234 | 255 |
| 96 | 0 | 0 | 48 | 96 | 140 | 176 | 204 | 232 | 255 |
| 128 | 0 | 0 | 43 | 81 | 128 | 167 | 201 | 232 | 255 |
| 160 | 0 | 0 | 35 | 66 | 117 | 160 | 196 | 229 | 256 |
| 192 | 0 | 0 | 2 | 56 | 105 | 152 | 192 | 227 | 255 |
| 224 | 0 | 0 | 0 | 50 | 85 | 139 | 186 | 224 | 255 |
| 255 | 0 | 0 | 0 | 44 | 75 | 136 | 181 | 215 | 255 |

FIG. 5

MAXIMUM LUMINANCE → +16

| LUMINANCE (BRIGHTNESS) | LUMINANCE RATIO (DUTY RATIO) (%) | PANEL SURFACE TEMPERATURE (℃) |
|---|---|---|
| +16 | 100.0 | A |
| +15 | 97.5 | A-a |
| +14 | 95.0 | A-2a |
| +13 | 92.5 | A-3a |
| +12 | 90.0 | A-4a |
| +11 | 87.5 | · |
| +10 | 85.0 | · |
| +9 | 82.5 | · |
| +8 | 80.0 | · |
| +7 | 77.5 | · |
| +6 | 75.0 | · |
| +5 | 72.5 | · |
| +4 | 70.0 | · |
| +3 | 67.5 | · |
| +2 | 65.0 | · |
| +1 | 62.5 | · |
| 0 | 60.0 | · |
| -1 | 57.5 | · |
| -2 | 55.0 | · |
| -3 | 52.5 | · |
| -4 | 50.0 | · |
| -5 | 47.5 | · |
| -6 | 45.0 | · |
| -7 | 42.5 | · |
| -8 | 40.0 | · |
| -9 | 37.5 | · |
| -10 | 35.0 | · |
| -11 | 32.5 | · |
| -12 | 30.0 | · |
| -13 | 27.5 | · |
| -14 | 25.0 | · |
| -15 | 22.5 | · |
| -16 | 20.0 | A-32a |

FIG. 6

| TABLE NUMBER | PANEL SURFACE TEMPERATURE (MAXIMUM LUMINANCE) | SENSOR TEMPERATURE (MAXIMUM LUMINANCE) |
|---|---|---|
| | SET VALUE(℃) | MEASURED VALUE(℃) |
| 0 | 0~12 | 0~1 |
| 1 | 12~17 | 1~5 |
| 2 | 17~22 | 5~11 |
| 3 | 22~27 | 11~16 |
| 4 | 27~32 | 16~22 |
| 5 | 32~37 | 22~28 |
| 6 | 37~45 | 28~38 |
| 7 | 45~ | 38~ |

| | | | | | | | | | | | |
|---|---|---|---|---|---|---|---|---|---|---|---|
| brb | 0 | 1 | 2 | 3 | 4 | ・・・ | 251 | 252 | 253 | 254 | 255 |
| bra | 0 | 16 | 23 | 28 | 32 | ・・・ | 253 | 253 | 254 | 254 | 255 |

LIQUID CRYSTAL DISPLAY DEVICE

CROSS REFERENCE TO RELATED APPLICATIONS

This application is a Divisional, which claims priority to copending U.S. application Ser. No. 13/500,812 filed on Apr. 6, 2012, which is a National Phase of PCT International Application No. PCT/JP2010/067357 filed on Oct. 4, 2010, which claims priority under 35 U.S.C. §119(a) to Application No. 2009-233386 filed in Japan on Oct. 7, 2009, Application No. 2009-235925 filed in Japan on Oct. 13, 2009, Application No. 2010-087506 filed in Japan on Apr. 6, 2010 and Application No. 2010-091530 filed in Japan on Apr. 12, 2010. The entire contents of all of the above applications are hereby incorporated by reference.

TECHNICAL FIELD

The present invention relates to a liquid crystal display device, and, more particularly, to a liquid crystal display device having an over drive function of improving the response speed of liquid crystal to a video signal and having a function of adjusting the gamma characteristic depending on the temperature detected by a temperature sensor.

BACKGROUND ART

A flat panel display such as an LCD (liquid crystal display) is currently prevailing as a display device of a personal computer, a television set, etc., in place of a cathode ray tube (CRT) that has hitherto mainly been used. The LCD is a display device that acquires a desired image signal by applying an electric field to a liquid crystal layer having an anisotropic dielectric constant injected between two substrates and by adjusting the strength of the electric field to adjust the amount of light passing through the substrates. A typical type thereof is a TFT LCD using thin film transistors (TFTs) as switching elements.

Since recently the LCD is widely used as a display device of the television set, it needs to display dynamic images. Due to its slow response speed, however, the LCD has hitherto entailed a problem that it may be difficult to display the dynamic images.

To improve such a liquid crystal response speed, a liquid crystal drive (over drive) method is known that applies to a liquid crystal display panel a drive voltage higher than a predetermined gradation voltage for a current frame input image signal, depending on the combination of a one-frame preceding input image signal and the current frame input image signal. Hereinafter, in this description, this drive method is referred to as an overshoot drive.

Although the liquid crystal response speed is known to have an extremely large temperature dependence, some conventional liquid crystal display devices adjust the overshoot drive voltage depending on the use temperature environment. A temperature sensor (thermistor, etc.) for measuring the use temperature is desirably, from its original purpose, disposed within the liquid crystal display panel, but, due to the difficulty arising from reasons of hindering the display, etc., it is attached to another member such as a circuit board.

For this reason, the temperature sensor is placed at a position least influenced by a heat generation action of the other member such as an inverter transformer or a power-supply unit for driving and lighting a backlight light source so that the temperature of the liquid crystal display panel can be detected as accurately as possible. A proper enhanced conversion parameter corresponding to the detected temperature of the liquid crystal display panel is then selected so as to supply proper enhanced conversion data (write gradation data), i.e., an overshoot drive voltage (hereinafter, referred to as OS drive voltage) to the liquid crystal display panel.

Regarding a conventional technique of varying the OS drive voltage depending on the temperature in the liquid crystal display device, Patent Document 1 for example describes one having a temperature sensor that detects a temperature in the device and a disposition form detecting portion that detects a disposition form of the device, so as to allow a proper enhanced conversion data to be acquired all times irrespective of the device disposition form, for the supply to the liquid crystal display panel.

The liquid crystal display device as described above is provided with a gamma correction circuit that performs a gamma correction on input digital image data so as to enable a more natural image display or a display of a quality in accordance with the user's preference. In one example of such a gamma correction circuit, proper conversion data set in accordance with the gamma characteristic of the liquid crystal panel used for example is stored in advance in a lookup table (LUT) set in a ROM, etc. Then, the gamma correction circuit reads out conversion data corresponding to the gradation value of the input digital image data from the LUT to thereby perform the gamma correction.

It is known that the liquid crystal response speed has an extremely large temperature dependence as described above, with the result that the gamma curve varies depending on the change in the ambient temperature. A method is disclosed of variably controlling the gate voltage applied to the liquid crystal panel in accordance with the ambient temperature detected by the temperature sensor (thermistor, etc) so as to correct the temperature-dependent variation (gamma offset) of the gamma curve to keep the gamma curve constant (e.g., see Patent Document 2).

PRIOR ART DOCUMENTS

Patent Documents

Patent Document 1: Japanese Laid-Open Patent Publication No. 2004-272050

Patent Document 2: Japanese Laid-Open Patent Publication No. 2008-185932

SUMMARY OF THE INVENTION

Problem to be Solved by the Invention

In the conventional overshoot drive method, the OS drive voltage is determined based on the correlation between the sensor temperature (ambient temperature) at the time of the backlight maximum luminance value and the panel surface temperature. Specifically, the correlation between the sensor temperature and the panel surface temperature can be represented by a cubic approximation curve depicted in FIG. 4(A) that will be described later. Then, when the sensor temperature changes, the OS drive voltage is varied following the change.

However, for example, when the lighting luminance of the backlight is changed from the maximum to the minimum by the user setting, etc., the sensor temperature may possibly not change at once although the panel surface temperature changes rapidly. In such a case, the OS drive voltage needs to be varied since the panel surface temperature changes. Due to no change in the sensor temperature, however, the OS drive voltage following it cannot be varied. Thus, in spite of the need to increase the OS drive voltage when the panel surface temperature lowers, a proper OS drive voltage cannot be applied to the liquid crystal panel, resulting in a lowered liquid crystal response speed and therefore in a degraded image quality.

On the contrary, the liquid crystal display device described in the Patent Document 1 cannot solve the above problem since no consideration is paid to the change in the panel surface temperature attendant on the change in the backlight lighting luminance.

Although it is desirable as described above for the temperature sensor for measuring the ambient temperature to be disposed within the liquid crystal display panel for its original purpose, the temperature sensor is attached to the other member such as the circuit board due to the difficulty arising from the reasons of hindering the display, etc. For this reason, the temperature sensor is placed at a position least subjected to a heat generation action of the other member such as the inverter transformer or the power-supply unit for driving and lighting the backlight light source so that the temperature of the liquid crystal display panel can be detected as accurately as possible. The correlation between the sensor temperature and the panel surface temperature can be represented by the cubic approximation curve depicted in FIG. 4(A) described later.

At that time there may be a case where the sensor temperature does not change immediately though the panel surface temperature changes rapidly, when for example the lighting luminance of the backlight is changed from the maximum to the minimum by the user setting, etc. Then, it is known that when the backlight luminance is changed from the maximum to the minimum, the gamma value deviates from the set value (e.g., 2.2) depending on the change in the panel surface temperature. The method described in Patent Document 2, however, adjusts the gamma offset by varying the gate voltage as a function of the sensor temperature, and hence, it cannot adjust the gamma offset if the sensor temperature remains unchanged though the panel surface temperature changes as described above.

The present invention was conceived in view of the above circumstances and an object thereof is to provide a liquid crystal display device capable of executing a proper overshoot drive even when the panel surface temperature changes as a result of the change in the lighting luminance of the backlight.

Another object of the present invention is to provide a liquid crystal display device capable of executing a proper gamma correction even when the panel surface temperature changes as a result of the change in the lighting luminance of the backlight.

Means to Solve the Problem

In order to solve the above problem, a liquid crystal display device of the present invention is a liquid crystal display device having a liquid crystal panel displaying an input video signal, a light source illuminating the liquid crystal panel, and a light source luminance control portion controlling a lighting luminance of the light source, the liquid crystal display device comprising: a temperature detecting portion that detects a temperature within the liquid crystal display device; an enhanced converting portion that evaluates an enhanced conversion parameter for allowing a transmittance of the liquid crystal panel to reach a transmittance defined by the input video signal after the elapse of one vertical display period of the liquid crystal panel, to output an applied voltage signal to the liquid crystal panel based on the enhanced conversion parameter; and a panel temperature correcting portion that, when the lighting luminance of the light source changes, corrects a panel surface temperature of the liquid crystal panel corresponding to a temperature detected by the temperature detecting portion, based on the changed lighting luminance; the enhanced converting portion variably controlling the enhanced conversion parameter based on the panel surface temperature corrected by the panel temperature correcting portion.

A second technical means is the liquid crystal display device as defined in the first technical means, comprising a memory that stores first correlation data between the temperature detected by the temperature detecting portion when the light source is at its maximum lighting luminance and the panel surface temperature of the liquid crystal panel and second correlation data between the lighting luminance of the light source and a correction value for the panel surface temperature at the maximum lighting luminance of the liquid crystal panel, wherein when the lighting luminance of the light source changes, the panel temperature correcting portion evaluates, based on the first correlation data, a panel surface temperature at the maximum lighting luminance of the liquid crystal panel corresponding to the temperature detected by the temperature detecting portion, a correction of the panel surface temperature depending on the lighting luminance is carried out based on the second correlation data.

A third technical means is the liquid crystal display device as defined in the first technical means, comprising a memory that stores, for each lighting luminance of the light source, correlation data between the temperature detected by the temperature detecting portion and the panel surface temperature of the liquid crystal panel, wherein when the lighting luminance of the light source changes, the panel temperature correcting portion corrects a panel surface temperature of the liquid crystal panel corresponding to the temperature detected by the temperature detecting portion, based on the correlation data.

A fourth technical means is the liquid crystal display device as defined in the first technical means, wherein the panel temperature correcting portion performs the correction if it is determined when the lighting luminance of the light source changes that the temperature detected by the temperature detecting portion does not change.

A fifth technical means is the liquid crystal display device as defined in the first technical means, comprising an area dividing portion that divides the liquid crystal panel into a plurality of areas, wherein the panel temperature correcting portion corrects the panel surface temperature for each of the areas obtained by dividing the liquid crystal panel, based on the changed lighting luminance, and wherein the enhanced converting portion variably controls the enhanced conversion parameter for each area of the liquid crystal panel, based on the panel surface temperature corrected by the panel temperature correcting portion.

A sixth technical means is the liquid crystal display device as defined in the fifth technical means, wherein the temperature detecting portion has a less number of temperature measurement points than the number of the plurality of areas and estimates an ambient temperature of each area based on the temperatures at the temperature measurement points.

A seventh technical means is the liquid crystal display device as defined in the fifth technical means, wherein the temperature detecting portion has the same number of temperature measurement points as the number of the plurality of areas and regards the temperatures at the temperature measurement points as ambient temperatures of the areas.

An eighth technical means is a liquid crystal display device having a liquid crystal panel displaying an input video signal, a light source illuminating the liquid crystal panel, and a light source luminance control portion controlling a lighting luminance of the light source, the liquid crystal display device comprising: a temperature detecting portion that detects a temperature within the liquid crystal display device; a gamma correcting portion that performs a gamma correction of the input video signal; and a panel temperature correcting portion that, when the lighting luminance of the light source changes, corrects a panel surface temperature of the liquid crystal panel corresponding to the temperature detected by the temperature detecting portion, based on the changed lighting luminance; the gamma correcting portion calculating a gamma value corresponding to the panel surface temperature corrected by the panel temperature correcting portion, the gamma correcting portion converting a gradation value of the input video signal in accordance with the calculated gamma value, to output the converted gradation value.

A ninth technical means is the liquid crystal display device as defined in the eighth technical means, comprising a memory that stores first correlation data between the temperature detected by the temperature detecting portion when the light source is at its maximum lighting luminance and the panel surface temperature of the liquid crystal panel and second correlation data between the lighting luminance of the light source and a correction value for the panel surface temperature at the maximum lighting luminance of the liquid crystal panel, wherein when the lighting luminance of the light source changes, the panel temperature correcting portion finds, based on the first correlation data, a panel surface temperature at the maximum lighting luminance of the liquid crystal panel corresponding to the temperature detected by the temperature detecting portion, a correction of the panel surface temperature depending on the lighting luminance is carried out based on the second correlation data.

A tenth technical means is the liquid crystal display device as defined in the eighth technical means, comprising a memory that stores, for each lighting luminance of the light source, correlation data between the temperature detected by the temperature detecting portion and the panel surface temperature of the liquid crystal panel, wherein when the lighting luminance of the light source changes, the panel temperature correcting portion corrects a panel surface temperature of the liquid crystal panel corresponding to the temperature detected by the temperature detecting portion, based on the correlation data.

An eleventh technical means is the liquid crystal display device as defined in the ninth technical means, wherein the gamma correcting portion calculates a gamma value corresponding to the panel surface temperature corrected by the panel temperature correcting portion, based on third correlation data between the panel surface temperature at the maximum lighting luminance of the liquid crystal panel and a correction value for a predetermined gamma set value in the liquid crystal display device.

A twelfth technical means is the liquid crystal display device as defined in the eighth technical means, wherein if it is determined when the lighting luminance of the light source changes as a result of a user's operation input that the gamma value calculated by the gamma correcting portion differs from the predetermined gamma set value in the liquid crystal display device, a change is made from the gamma set value to the calculated gamma value concurrently with the change in the lighting luminance of the light source.

A thirteenth technical means is the liquid crystal display device as defined in the eighth technical means, wherein if it is determined when the lighting luminance of the light source automatically changes depending on a change in ambient brightness that the gamma value calculated by the gamma correcting portion differs from the predetermined gamma set value in the liquid crystal display device, a gradual change is made from the gamma set value to the calculated gamma value.

A fourteenth technical means is the liquid crystal display device as defined in the eighth technical means, wherein if it is determined when the lighting luminance of the light source changes that the temperature detected by the temperature detecting portion does not change by a predetermined value or more, the panel temperature correcting portion corrects, based on the lighting luminance, a panel surface temperature of the liquid crystal panel corresponding to the temperature detected by the temperature detecting portion.

A fifteenth technical means is the liquid crystal display device as defined in the eighth technical means, wherein the gamma correcting portion calculates, for each of white, red, green, and blue, a gamma value corresponding to the panel surface temperature corrected by the panel temperature correcting portion, wherein if it is determined that the gamma value of the white is equal to the gamma value of the green, the gamma correcting portion determines whether the gamma value of each of the red and the blue is equal to the gamma value of the green, and wherein if it is determined that the gamma value of each of the red and the blue is not equal to the gamma value of the green, the gamma correcting portion adjusts the gamma value of each of the red and the blue to become equal to the gamma value of the green.

A sixteenth technical means is the liquid crystal display device as defined in the eighth technical means, comprising an area dividing portion that divides the liquid crystal panel into a plurality of areas, wherein the panel temperature correcting portion corrects a panel surface temperature for each of the areas obtained by dividing the liquid crystal panel, based on the changed lighting luminance, and wherein the gamma correcting portion calculates a gamma value for each of the areas of the liquid crystal panel based on the panel surface temperature corrected by the panel temperature correcting portion, the gamma correcting portion converting a gradation value of the input video signal on an area-by-area basis, in accordance with the calculated gamma value, to output the converted gradation value.

A seventeenth technical means is the liquid crystal display device as defined in the sixteenth technical means, wherein the temperature detecting portion has a less number of temperature measurement points than the number of the plurality of areas and estimates an ambient temperature of each area based on the temperatures at the temperature measurement points.

An eighteenth technical means is the liquid crystal display device as defined in the sixteenth technical means, wherein the temperature detecting portion has the same number of temperature measurement points as the number of the plurality of areas and regards the temperatures at the temperature measurement points as ambient temperatures of the areas.

A nineteenth technical means is the liquid crystal display device as defined in the sixteenth technical means, wherein the gamma correcting portion calculates a gamma value corresponding to the panel surface temperature corrected by the panel temperature correcting portion, on an area-by-area basis for each of white, red, green, and blue, wherein if it is determined that the gamma value of the white is equal to the gamma value of the green, the gamma correcting portion determines whether the gamma value of each of the red and the blue is equal to the gamma value of the green, and wherein if it is determined that the gamma value of each of the red and the blue is not equal to the gamma value of the green, the gamma correcting portion adjusts, on an area-by-area basis, the gamma value of each of the red and the blue to become equal to the gamma value of the green.

Effects of the Invention

According to the present invention, even when the panel surface temperature changes as a result of a change in the backlight lighting luminance, the overshoot drive voltage can be varied depending on the change in the panel surface temperature to thereby achieve a proper overshoot drive.

According to the present invention, even when the panel surface temperature changes as a result of a change in the backlight lighting luminance, there can be calculated a gamma value that depends on the change in the panel surface temperature to thereby achieve a proper gamma correction.

BRIEF DESCRIPTION OF DRAWINGS

FIG. 3 is a diagram depicting an example of an OS set value table consisting of enhanced conversion parameters.

FIG. 5 is a diagram for explaining an example of a method of estimating a panel surface temperature from the backlight luminance.

FIG. 6 is a diagram depicting an example of an enhanced conversion parameter changeover table for changing over the OS set value table depicted in FIG. 3.

MODES FOR CARRYING OUT THE INVENTION

Preferred embodiments of a liquid crystal display device according to the present invention will now be described with reference to the accompanying drawings.

Figure 1:
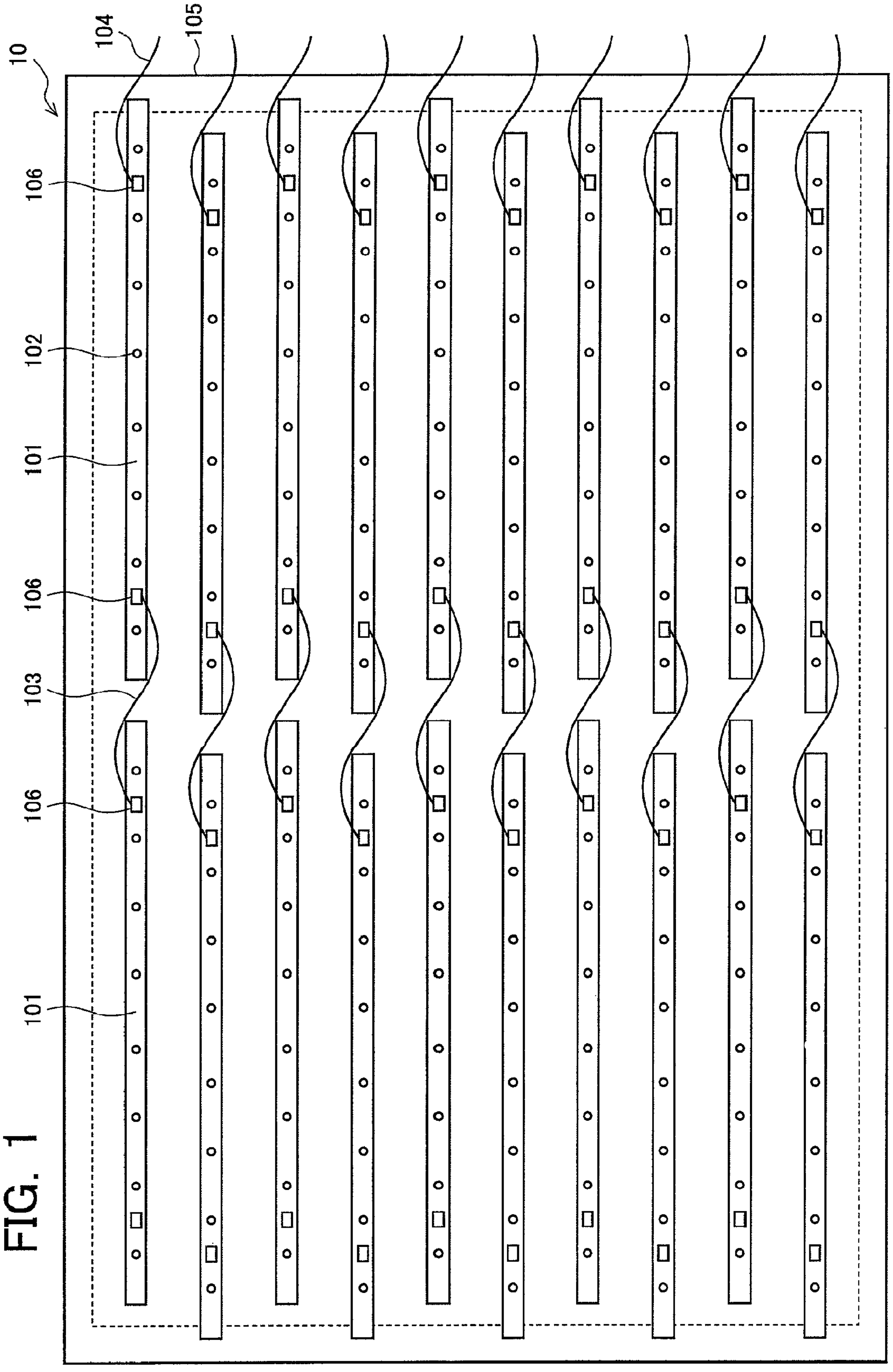
FIG. 1 is a diagram depicting a configuration example of a backlight applicable to a liquid crystal display device of the present invention.

FIG. 1 is a diagram depicting a configuration example of a backlight applicable to a liquid crystal display device of the present invention. The backlight of this example is configured as an arrayed LED backlight.

The backlight 10 includes a plurality of LED substrates 101 arrayed on a chassis 105. The LED substrates 101 have a laterally elongated rectangular shape and are oriented such that the longitudinal direction of the rectangle coincides with the horizontal direction of a screen of the liquid crystal display device.

The example of FIG. 1 exemplifies the arrayed LED backlight applied to a 40-inch liquid crystal display device. In this case, the LED substrates 101 are each divided into two in the lateral direction, with ten rows of LED substrates 101 being arrayed in the vertical direction, each row consisting of the two substrates. The reason for the lateral division into two lies in that in general the LED substrate 101 has vertical and lateral maximum outer dimensions, i.e., standard dimensions upon the manufacturing. The standard dimensions differ by the material of the LED substrate 101 or by the manufacturing device, and, for example, are 510 mm in vertical and 340 mm in lateral directions. For this reason, if either vertical or lateral scale of the LED substrate 101 exceeds the standard dimension, then the LED substrate 101 is divided for fabrication into some segments.

In the embodiments of the present invention, such a lateral division of the LED substrate 101 is not indispensable, and applicable configuration examples of the present invention are shown herein.

Each of the LED substrates 101 has a plurality of (eight in this case) LEDs 102 aligned in a rectilinear manner thereon. Namely, the arrayed LED backlight 10 of FIG. 1 uses a total of 160 LEDs 102 on the entire screen. The LEDs 102 are arranged in the form of a hexagonal lattice as a whole. In the hexagonal lattice arrangement, the other LEDs 102 are arranged at apexes of an imaginary regular hexagon formed around one LED 102. This arrangement allows the backlight 10 to irradiate uniform backlight light onto the liquid crystal panel.

The LEDs 102 mounted on each of the LED substrates 101 are connected in series with each other by a wiring pattern (not depicted) formed on each LED substrate 101. A harness 103 is disposed to connect the horizontally halved LED substrates 101 to each other and a harness 104 is disposed to connect one of the LED substrates 101 and an external driver substrate. Furthermore, each of the LED substrates 101 has connectors 106 to which the harnesses 103 and 104 are connected. Each of the LED substrates 101 is fixed to the chassis 105 by a screw not depicted disposed in the vicinity of each of the connectors 106.

The backlight 10 is provided with an LED driver mounted on a driver substrate (drive circuit substrate) not depicted. The LED driver supplies a current to the serially connected LEDs 102 to drive the LEDs 102 by current control or PWM (Pulse Width Modulation) control or by both the controls. This enables each row unit consisting of two LED substrates, of plural rows of the LED substrates 101 in the vertical direction to be driven independently from each other.

Ordinarily, the number of the LEDs differs depending on the size of the screen. In the case of the liquid crystal display device with the 40-inch screen of the above example, the number of units of the LED substrates 101 each row consisting of two substrates is 10, whereas for example the number of units is 9 for 32 inch, and the number of units is 12 for 46 inch. In this manner, the number of units of the LED substrates 101 (i.e., the number of LEDs) is properly changed depending on the screen size, the luminance required, etc. The number of the LEDs and the number of LEDs per substrate are merely exemplary and, in the present invention, are not intended to limit the number of the LEDs and the number of the units.

The backlight applicable to the liquid crystal display device of the present invention is not limited to the arrayed LED backlight as described above, and it may be a matrix LED backlight in which LEDs are arranged all over a substrate of substantially the same size as that of the both sides or a backlight in which a plurality of CCFLs (Cold Cathode Fluorescent Lamps) are arranged in parallel. In the following example, the arrayed LED backlight is used for description.

First Embodiment

Figure 2:
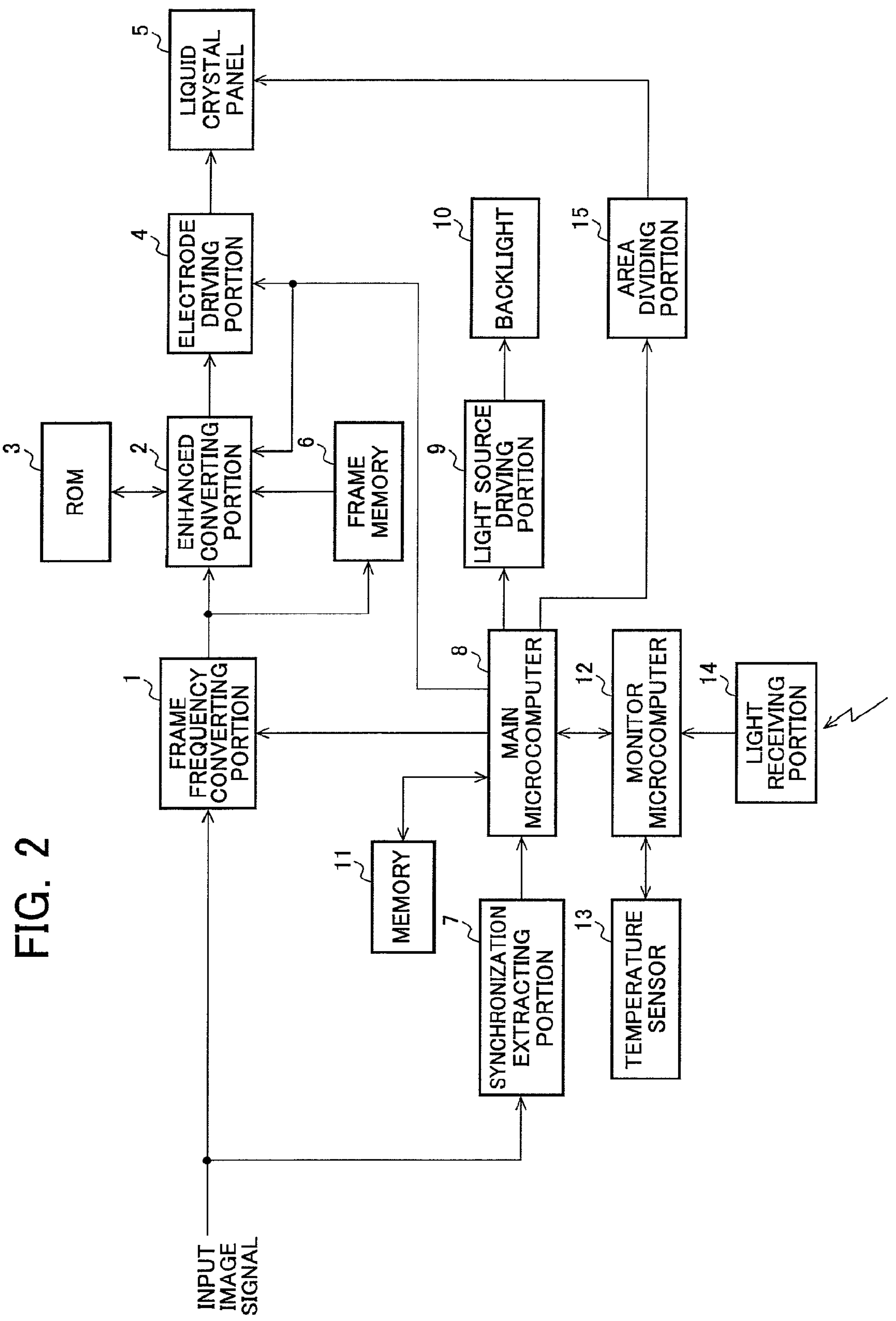
FIG. 2 is a block diagram depicting a schematic configuration example of a liquid crystal display device according to a first embodiment of the present invention.

FIG. 2 is a block diagram depicting a schematic configuration example of a liquid crystal display device according to a first embodiment of the present invention. The liquid crystal display device is provided with a frame frequency converting portion 1, an enhanced converting portion 2, a ROM 3, an electrode driving portion 4, a liquid crystal panel 5, a frame memory 6, a synchronization extracting portion 7, a main microcomputer 8, a light source driving portion 9, a backlight 10, a memory 11, a monitor microcomputer 12, a temperature sensor 13, a light receiving portion 14, and an area dividing portion 15.

The synchronization extracting portion 7 extracts a vertical/horizontal synchronization signal from an input image signal (e.g., a progressive scan signal at 60 Hz). The main microcomputer 8 includes a control CPU and performs an action control of the portions based on the vertical/horizontal synchronization signal extracted by the synchronization extracting portion 7. The frame frequency converting portion 1 converts the frame frequency of the input image signal into twice the frequency (120 Hz) for example, based on a control signal from the main microcomputer 8. Although this example is described as including the frame frequency converting portion 1, there may be employed another configuration not including the frame frequency converting portion 1.

The frame frequency converting portion 1 performs a frequency conversion such that one-frame image of the 2 input image signal has twice the frame frequency (120 Hz), based on the control signal from the main microcomputer 8. This allows successive output of an image signal whose frame display cycle (vertical display cycle) is 1/120 sec (approx. 8.3 msec) for the liquid crystal panel 5.

The ROM 3 stores an enhanced conversion parameter for causing the liquid crystal to respond to a target gradation of image data (Current Data) of the current vertical display period within one frame period (vertical display period=approx. 8.3 msec) at a specific panel surface temperature. In this case, as depicted in FIG. 3, an OS (overshoot) set value table is stored therein that consists of enhanced conversion parameters for 9 typical gradations for each 32 gradations before and after one vertical display period. It is to be noted that these gradation conversion parameters are acquired from actual measurements of the optical response characteristics of the liquid crystal panel 5.

Image data is written into/read from the frame memory 6 at the frame display cycle (vertical display cycle=8.3 msec) for the liquid crystal panel 5, i.e., image data (Current Data) of the current frame period is written thereinto, and image data (Previous Data) of one-frame preceding period is read therefrom, for the output to the enhanced converting portion 2.

From a gradation transition of image data before and after one frame period, the enhanced converting portion 2 refers to the OS set value table of the ROM 3 to read a corresponding gradation conversion parameter and, using the gradation conversion parameter, acquires an enhanced conversion signal (write gradation data) that allows the liquid crystal to have a transmittance defined by the current image data after the elapse of one frame period, for the output to the electrode driving portion 4. At one frame cycle of an input image signal, the electrode driving portion 4 performs write scanning of the image signal.

Based on a vertical synchronizing signal extracted by the synchronization extracting portion 7, the main microcomputer 8 sends a control signal for controlling turning on/off of the backlight 10 to the light source driving portion 9. The light source driving portion 9 is configured from an FPGA (Field Programmable Gate Array) for example and performs the turning on/off of the backlight 10 in accordance with a control signal output from the main microcomputer 8.

Although in this embodiment, the enhanced conversion parameters are stored in the ROM 3, use of the ROM 3 may be replaced by preparing a two-dimensional function f (pre, cur) having as its variables a pre-transition gradation and a current gradation and by using the function to find an enhanced conversion parameter for compensating the optical response characteristic of the liquid crystal panel 5 to the vertical display cycle (scanning cycle).

As in this embodiment, the ROM 3 may be provided that stores a two-dimensional matrix-like table having as its addresses the pre-transition gradation and the current gradation so that, with the frame frequency of an input image signal being converted into arbitrary N (N=natural number) times, the overshoot drive may be effected based on the gradation transition of the image signal before and after the vertical display period reduced to 1/N.

The monitor microcomputer 12 is connected to the light receiving portion 14 that receives an operation signal from a remote control (not depicted) operated by the user and to the temperature sensor 13 such as the thermistor. The temperature sensor 13 is disposed e.g., on a circuit board within the liquid crystal display device to measure the in-device temperature. Hereinafter, the temperature measured by the temperature sensor 13 is referred to as a sensor temperature. The monitor microcomputer 12 is connected to the main microcomputer 8 to transmit the operation signal from the remote control, the sensor temperature from the temperature sensor 13, etc., to the main microcomputer 8.

The memory 11 stores correlation data depicted in FIG. 4 described later such that the main microcomputer 8 can refer to the correlation data as needed, the correlation data including first correlation data when the backlight 10 is at its maximum lighting luminance between the temperature detected by the temperature sensor 13 and the panel surface temperature of the liquid crystal panel 5 and second correlation data between the lighting luminance of the backlight 10 and the correction value for the panel surface temperature at the maximum lighting luminance of the liquid crystal panel 5.

The main feature of the present invention lies in that a proper overshoot drive is ensured even when the panel surface temperature changes as a result of a change in the backlight lighting luminance. As a configuration for this end, the liquid crystal display device is provided with the liquid crystal panel 5 that displays an input video signal; the backlight 10 that is a light source for irradiating the liquid crystal panel 5; and a light source luminance control portion that controls the lighting luminance of the backlight 10. The light source luminance control portion is implemented by the main microcomputer 8 and the light source driving portion 9.

The liquid crystal display device is provided with the temperature sensor 13 that corresponds to a temperature detecting portion for detecting the temperature within the liquid crystal display device; the enhanced converting portion 2 that finds an enhanced conversion parameter for causing the transmittance of the liquid crystal panel 5 to reach a transmittance defined by the input video signal after the elapse of one vertical display period of the liquid crystal panel 5 and that, based on the enhanced conversion parameter, issues an applied voltage signal to the liquid crystal panel 5; and a panel temperature correcting portion that, when the lighting luminance of the backlight 10 changes, corrects a panel surface temperature of the liquid crystal panel 5 corresponding to a temperature detected by the temperature sensor 13, based on the changed lighting luminance, the enhanced converting portion 2 variably controlling the enhanced conversion parameter based on the panel surface temperature corrected by the panel temperature correcting portion. The panel temperature correcting portion is implemented by the main microcomputer 8. A specific example will hereafter be described of a method of estimating a panel surface temperature depending on a change in the backlight luminance according to the present invention.

Figure 4:
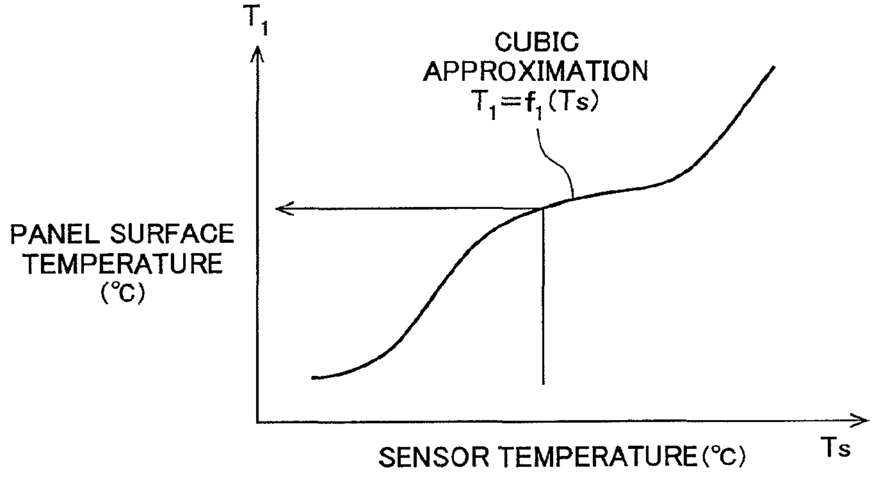
FIG. 4 is a diagram depicting examples of first correlation data indicative of a sensor temperature-panel surface temperature correlation and second correlation data indicative of a backlight luminance-temperature correction value correlation.
Figure 4:
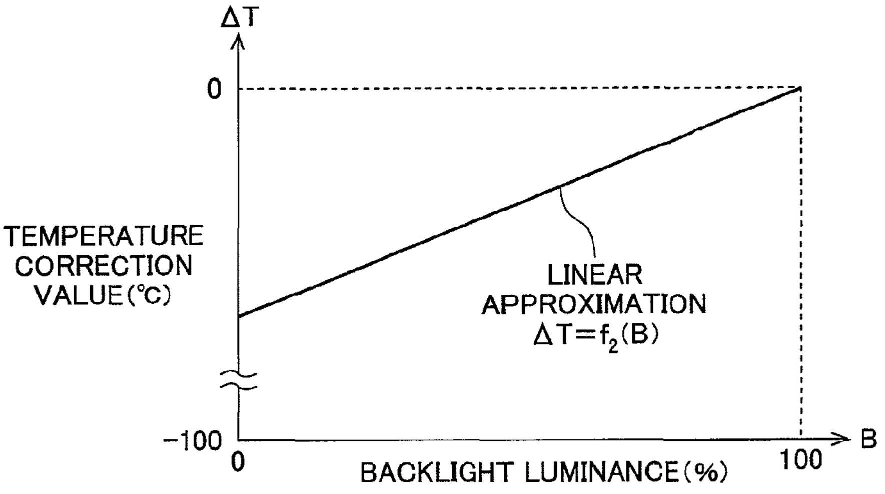

FIG. 4 is a diagram depicting examples of the first correlation data indicative of a sensor temperature-panel surface temperature correlation and the second correlation data indicative of a backlight luminance-temperature correction value correlation. FIG. 4(A) depicts an example of the first correlation data, with the axis of ordinates representing the panel surface temperature (unit: degrees) and the axis of abscissas representing the sensor temperature (unit: degrees). This first correlation data is acquired as a correlation between the sensor temperature and the panel surface temperature when the backlight 10 is actually at its maximum lighting luminance (duty of 100%) and can be approximated by a cubic in the form of a function $T_1=f_1(Ts)$. For example, it can be given as $$y=(5\times10^{-5})x^3-0.004x^2+1.230x-0.046 \qquad \text{Equation (1)}$$

$R^2=0.999$ ($R^2$ is a correlation coefficient)

FIG. 4(B) depicts an example of the second correlation data, with the axis of abscissas representing the backlight luminance (duty ratio, unit: %) and the axis of ordinates representing the temperature correction value (the amount of change in the panel surface temperature, unit: degrees). This second correlation data is acquired from an actual correlation between the backlight luminance (duty ratio) and the correlation value for the panel surface temperature at the maximum lighting luminance and can be linearly approximated by a function $\Delta T=f_2(B)$. It can be seen that with the temperature correction value 0 when the duty is 100%, the temperature correction value is linearly reduced according as the duty ratio lowers.

FIG. 5 is a diagram for explaining an example of a method of estimating a panel surface temperature from the backlight luminance. In the liquid crystal display device of this example, an item of "luminance (brightness)" is provided as an item settable by the user operation. To facilitate the user setting, the backlight luminance is divided into 33 levels ranging from +16 (maximum luminance) to −16 (minimum luminance), the levels being correlated respectively with the backlight duties. For example, if the user designates a luminance "+14" by the remote control, etc., then "95.0%" is set as the backlight duty.

Here, for example, if the user acts on the remote control, etc., to make a change from the maximum luminance +16 to a desired luminance (e.g., +14), then the panel surface temperature changes though the sensor temperature does not change, and therefore, the following method is used to estimate the panel surface temperature from the backlight duty.

In the liquid crystal display device depicted in the FIG. 2, when the monitor microcomputer 12 detects a change in the backlight duty caused by the user operation, it detects a sensor temperature of the temperature sensor 13. Then, the monitor microcomputer 12 transmits the detected sensor temperature to the main microcomputer 8. Since the main microcomputer 8 receives the sensor temperature periodically from the monitor microcomputer 12, it can compare a sensor temperature upon a duty change with the preceding sensor temperature to determine whether the temperature changes. Then, the main microcomputer 8 refers to the first correlation data depicted in FIG. 4(A) based on the sensor temperature upon the duty change, to find a panel surface temperature corresponding to the sensor temperature at the duty of 100%. The panel surface temperature at that time corresponds to the panel surface temperature "A" of FIG. 5.

Next, the main microcomputer 8 refers to the second correlation data depicted in FIG. 4(B) with the luminance (+14) changed by the user, to find a temperature correction value corresponding to the backlight duty. Since the relationship between the backlight duty and the temperature correction value can be linearly approximated as depicted in FIG. 4(B), description of this example will be made on the assumption that the panel surface temperature changes by a degrees when the luminance changes one level. In the case of this example, the change is made from the luminance (+16) of duty of 100% to two-level lower luminance (+14), and hence the amount of change in the panel surface temperature proves to be "2a".

Thus, the main microcomputer 8 can estimate the panel surface temperature corresponding to the luminance (+14) of the backlight 10 as being "A−2a" degrees. Using the above function, it is given as the panel surface temperature $Tp=T_1+\Delta T=f_1(Ts)+f_2(B)$. That is, when the lighting luminance of the backlight 10 changes, the main microcomputer 8 finds a panel surface temperature at the maximum lighting luminance of the liquid crystal panel 5 corresponding to the temperature detected by the temperature sensor 13, on the basis of the first correlation data (FIG. 4(A)) stored in the memory 11 and subjects the panel surface temperature to an actual lighting luminance-based correction on the basis of the second correlation data (FIG. 4(B)) stored in the memory 11. This enables an estimation of an accurate panel surface temperature corresponding to the luminance change.

FIG. 6 is a diagram depicting an example of an enhanced conversion parameter changeover table for changing over the OS set value table depicted in FIG. 3. The enhanced conversion parameter changeover table is stored in the memory 11 (or the ROM 3). The table number is for example a number of the OS set value table consisting of the enhanced conversion parameters depicted in FIG. 3 described above, and in this example, the ROM 3 stores eight different OS set value tables corresponding to the table numbers 0 to 7.

Each of these eight different OS set value tables is correlated with the sensor temperature and the panel surface temperature and can be changed over by the enhanced conversion parameter changeover table. The relationship between the sensor temperature and the panel surface temperature is acquired from the first correlation data depicted in FIG. 4(A) described above. That is, it is acquired from the correlation relationship between the sensor temperature and the panel surface temperature when the duty is 100% (the maximum lighting luminance).

In FIG. 6, for example, if the sensor temperature is greater than 0 degrees and less than 1 degrees (the panel surface temperature is greater than 0 degrees and less than 12 degrees), then the OS set value table of the table number "0" is selected, while if the sensor temperature is greater than or equal to 1 degrees and less than 5 degrees (the panel surface temperature is greater than or equal to 12 degrees and less than 17 degrees), then the OS set value table of the table number "1" is selected. Thereafter, in the same manner as the above, one of the eight different OS tables is selected depending on the sensor temperature.

In FIG. 2 described above, the main microcomputer 8 refers to the enhanced conversion parameter changeover table (FIG. 6) stored in the memory 11 using the panel surface temperature acquired by the method of the present invention set forth in FIG. 5 described above, to determine a table number and outputs the table number to the enhanced converting portion 2. The enhanced converting portion 2 determines an OS set value table of the ROM 3 based on the table number from the main microcomputer 8. Then the enhanced converting portion 2 refers to the determined OS set value table from the gradation transition of the image data before and after one frame period, to read out a corresponding gradation conversion parameter and, using the gradation conversion parameter, acquires an enhanced conversion signal (write gradation data) for allowing the liquid crystal to have a transmittance defined by the current image data after the elapse of one frame period, for the output to the electrode driving portion 4. At one frame period of an input image signal, the electrode driving portion 4 performs write scanning of the image signal.

In this manner, although it was not possible for the conventional method to change over the OS set value table until the sensor temperature changes, according to the method of the present invention, when the backlight lighting luminance changes, a panel surface temperature of the liquid crystal panel corresponding to a temperature detected by the temperature sensor is acquired based on the correlation data of the sensor temperature-panel surface temperature at the maximum lighting luminance so that the panel surface temperature can be corrected based on the changed lighting luminance, consequently enabling an estimation of an accurate panel surface temperature corresponding to a luminance change, thereby making it possible to change over the OS set value table.

For example, in FIG. 6, if the sensor temperature is greater than or equal to 5 degrees and less than 11 degrees at the backlight maximum luminance, then the panel surface temperature is estimated as being greater than or equal to 17 degrees and less than 22 degrees and the OS set value table of the table number 2 is selected. Here, in case that as a result of a change in the backlight luminance, only the panel surface temperature changes to e.g., 16 degrees to go out of the range greater than or equal to 17 degrees and less than 22 degrees without any change of the sensor temperature, there is intrinsically a need to change over to the OS set value table of the table number 1. Although the conventional method cannot achieve a changeover to the table of the table number 1 since the sensor temperature does not change at once, the method of the present invention can achieve the changeover to the table of the table number 1 since the panel surface temperature can be estimated as being 16 degrees.

Figure 7:
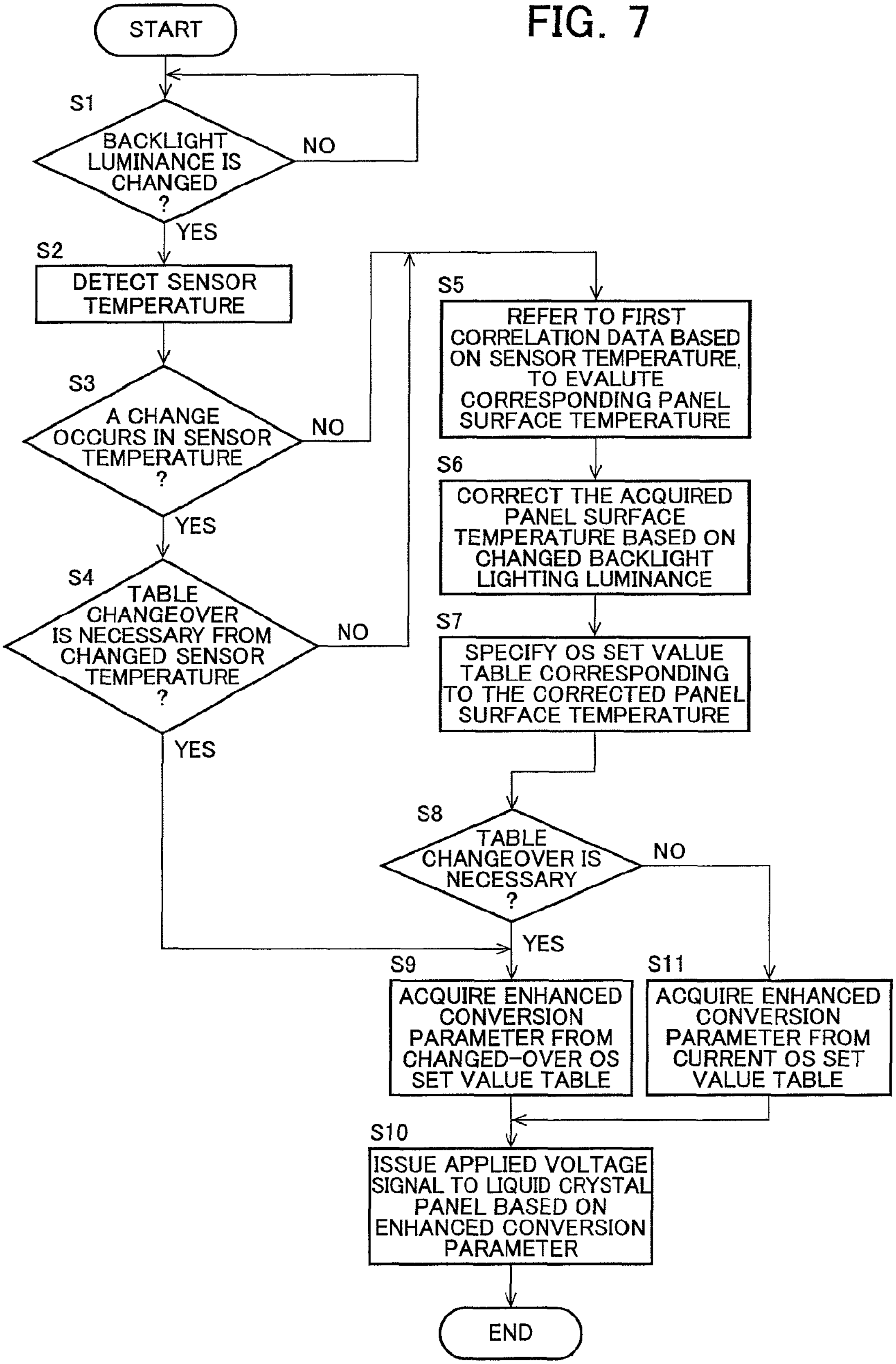
FIG. 7 is a flowchart for explaining an example of the method of estimating the panel surface temperature from the backlight luminance using the liquid crystal display device depicted in FIG. 2.

FIG. 7 is a flowchart for explaining an example of the method of estimating the panel surface temperature from the backlight luminance using the liquid crystal display device depicted in FIG. 2. First, the main microcomputer 8 determines whether the luminance of the backlight 10 is changed by the user setting, etc. (step S1), and, if it determines that the luminance of the backlight 10 is not changed (case of NO), goes to the standby status at the step S1. If it is determined at step S1 that the luminance of the backlight 10 is changed (case of YES), it detects a sensor temperature detected by the temperature sensor 13 (step S2).

Then, the main microcomputer 8 determines whether the sensor temperature changes before and after the change in the luminance of the backlight 10 (step S3). When determining a change in the sensor temperature, it may be determined whether there is a change exceeding a predetermined value (e.g., 2 degrees). If it is determined at step S3 that the sensor temperature changes (case of YES), then it determines from the changed sensor temperature whether there is a need to change over the OS set value table (step S4). If it is determined at step S3 that the sensor temperature does not change (case of NO), then it refers to the first correlation data (FIG. 4(A)) based on the sensor temperature, to find a corresponding panel surface temperature (step S5).

Referring next to the second correlation data depicted in FIG. 4(B), the main microcomputer 8 corrects the panel surface temperature acquired at step S5, based on the changed backlight lighting luminance (step S6). The main microcomputer 8 then refers to the enhanced conversion parameter changeover table depicted in FIG. 6, to specify an OS set value table (table number) corresponding to the corrected panel surface temperature (step S7) and determine whether the table changeover is necessary (step S8).

If it is then determined at step S8 that the OS set value table needs to be changed over (case of YES), the enhanced converting portion 2 accesses the ROM 3 to find an enhanced conversion parameter from the changed-over OS set value table (step S9) and issue an applied voltage signal to the liquid crystal panel 5 based on the enhanced conversion parameter (step S10). If it is determined at step S8 that the OS set value table need not be changed over (case of NO), the enhanced converting portion 3 accesses the ROM 3 to find an enhanced conversion parameter from the current OS set value table (step S11), allowing the procedure to go to step S10.

If it is determined at step S4 that the table changeover is necessary from the changed sensor temperature (case of YES), the procedure goes to step S9, whereas if it is determined at step S4 that the table changeover is not necessary (case of NO), the procedure goes to step S5.

Figure 8:
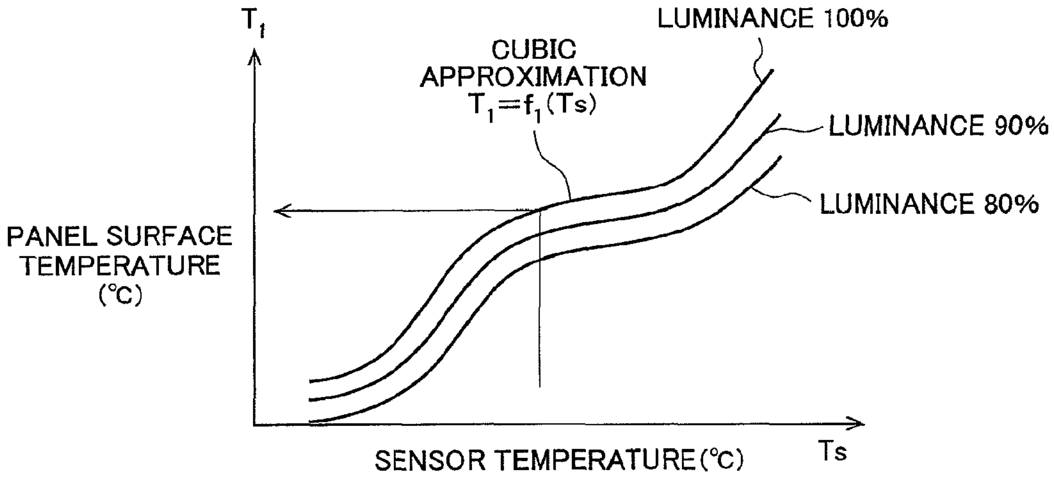
FIG. 8 is a diagram depicting an example of correlation data according to another embodiment of the present invention.

Another embodiment of the present invention will be described. Although in FIG. 4(A) described above the correlation between the sensor temperature and the panel surface temperature is acquired with the backlight 10 being actually at its maximum lighting luminance (at the backlight duty of 100%), this correlation may be acquired for each of the backlight duties. For example, as depicted in FIG. 8, the correlation data is acquired at the backlight duty (luminance) of 100%, 90%, 80%, etc., so that a plurality of pieces of correlation data are stored in the memory 11. The luminance interval is not limited to 10% and may be properly set. If the luminance changes to 90%, the main microcomputer 8 refers to correlation data of 90% luminance to find a panel surface temperature corresponding to the sensor temperature at that time. In this manner, the method using the correlation data for each lighting luminance can also acquire a panel surface temperature that depends on a change in the backlight luminance, similar to the method using the first correlation data and the second correlation data.

A further embodiment of the present invention will be described. Although up until now the panel surface temperature has been acquired in the vicinity of the substantial center of the liquid crystal panel 5, the panel surface temperature is uneven by areas of the liquid crystal panel 5. For this reason, a proper OS drive may possibly not be effected on some areas. Thus, this embodiment divides the liquid crystal panel 5 into a plurality of areas so that the panel surface temperature is acquired for each of the areas. The panel surface temperature for each area is subjected to a correction based on the changed lighting luminance.

Figure 9:
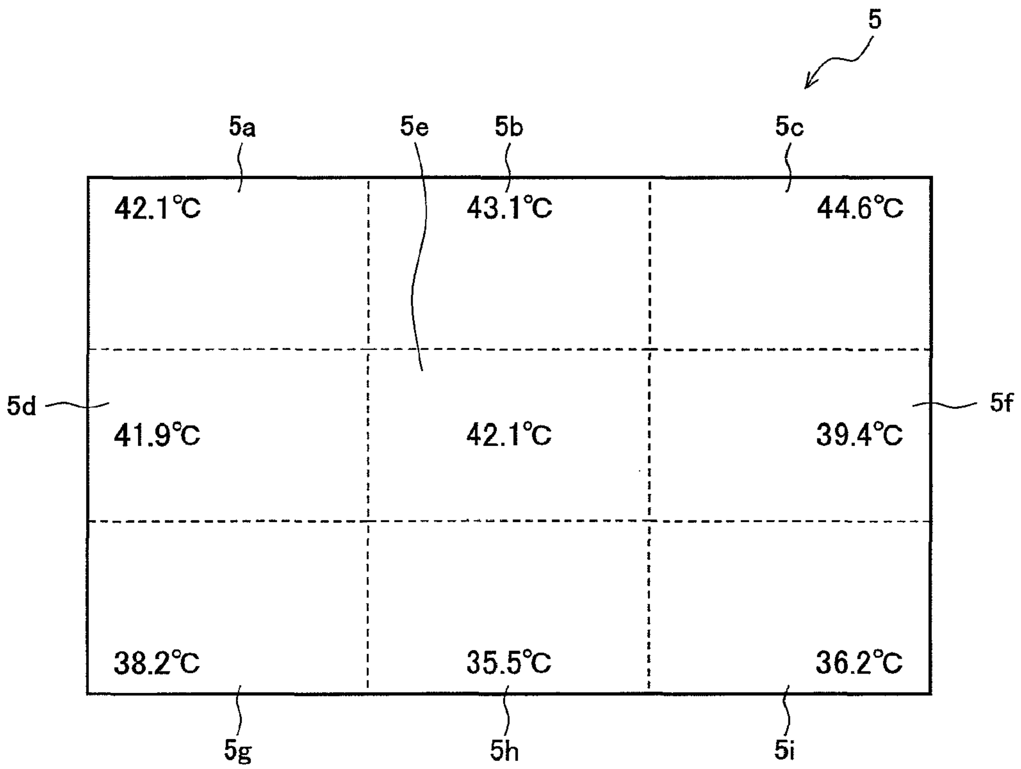
FIG. 9 is a diagram depicting an example of the distribution state of the panel surface temperature for each of areas obtained by dividing the liquid crystal panel.

FIG. 9 is a diagram depicting an example of the distribution state of the panel surface temperature for each of the areas obtained by dividing the liquid crystal panel 5. The liquid crystal display device depicted in FIG. 2 described above is provided with the area dividing portion 15 that divides the liquid crystal panel 5 into a plurality of areas. In this example, the liquid crystal panel 5 is divided into nine areas consisting of areas 5*a* to 5*i*, and, for each of the areas 5*a* to 5*i*, the memory 11 stores the first correlation data depicted in FIG. 4(A) described above and the second correlation data depicted in FIG. 4(B). Thus, the first correlation data and the second correlation data corresponding to the areas are prepared in advance and stored in the memory 11.

In FIG. 2, on the basis of the first correlation data and the second correlation data, the main microcomputer 8 corrects the panel surface temperature for each of the areas obtained by dividing the liquid crystal panel 5 based on the changed lighting luminance, while the enhanced converting portion 2 variably controls the enhanced conversion parameter for each of the areas of the liquid crystal panel 5 based on the panel surface temperature corrected by the main microcomputer 8.

That is, when the monitor microcomputer 12 detects a change in the backlight duty caused by the user operation, it detects a sensor temperature of the temperature sensor 13 for each of the areas 5*a* to 5*i*. At that time, the temperature sensor 13 may have a less number of temperature measurement points than the number of the plurality of areas so that the sensor temperature (ambient temperature) of each area can be estimated based on the temperatures at the temperature measurement points. In the case of this example, one to eight temperature measurement points may be set since the number of the areas is nine. For example, in the case where a temperature measurement point is disposed in the vicinity of the area 5*e* at the panel center, the temperature at this temperature measurement point is regarded as a sensor temperature of the area 5*e*. The sensor temperatures of the other areas 5*a* to 5*d* and 5*f* to 5*i* are estimated from the sensor temperature (i.e., the temperature at the temperature measurement point) of the area 5*e*. Specifically, temperature differences are measured in advance between the temperatures of the areas 5*a* to 5*d* and 5*f* to 5*i* and the temperature of the area 5*e* so that estimation can be made based on the temperature differences. The temperature sensor 13 may have the same number of temperature measurement points as the number of the plurality of areas so that the temperatures at the temperature measurement points can be regarded as sensor temperatures of the areas. In the case of this example, nine temperature measurement points are disposed since the number of the areas is nine. Specifically, the temperature measurement points are disposed in the vicinity of the nine areas 5*a* to 5*i* so that the temperatures at the temperature measurement points are regarded as the sensor temperatures of the areas 5*a* to 5*i*.

The monitor microcomputer 12 transmits the sensor temperatures of the areas 5*a* to 5*i* detected by the above to the main microcomputer 8. Due to the periodical reception of the sensor temperatures of the areas 5*a* to 5*i* from the monitor microcomputer 12, for each area the main microcomputer 8 can compare the sensor temperature upon a duty change with the sensor temperature immediately before the duty change and determine whether the temperature changes. For the area 5*a* for example, the main microcomputer 8 refers to the first correlation data depicted in FIG. 4(A) based on the sensor temperature upon the duty change, to find a panel surface temperature corresponding to the sensor temperature at the duty of 100%. The panel surface temperature at that time corresponds to the panel surface temperature “A” in FIG. 5 described above. The panel surface temperature “A” is a value that varies depending on the sensor temperature of each area, and in the case of the example of FIG. 9, the panel surface temperature of the area 5*a* is 42.1 degrees.

The main microcomputer 8 then refers to the second correlation data depicted in FIG. 4(B), for the area 5*a*, from the luminance (+14) changed by the user, to find a temperature correction value corresponding to the backlight duty. In the case of the example of FIG. 5, the change is made from the luminance (+16) at the duty of 100% to two-level lower luminance (+14), and hence the amount of change in the panel surface temperature turns out to be “2a”. Although the amount of change “a” in the panel surface temperature indicates that the panel surface temperature changes by a degrees when the luminance changes one level, this is a value differing depending on the areas.

The main microcomputer 8 can then estimate a panel surface temperature of the area 5*a* corresponding to the luminance (+14) of the backlight 10 as being “A−2a” degrees. The same method can apply to the estimation for the other areas 5*b* to 5*i*. Using the above function, the panel surface temperature for each area can be represented as $Tp=T_1+\Delta T=f_1(Ts)+f_2(B)$. When the lighting luminance of the backlight 10 changes, the main microcomputer 8 finds a panel surface temperature at the maximum lighting luminance of the liquid crystal panel 5 corresponding to a sensor temperature for each area detected by the temperature sensor 13, based on the first correlation data (FIG. 4(A)) stored in the memory 11, to correct the area-by-area panel surface temperature using the actual lighting luminance, based on the area-by-area second correlation data (FIG. 4(B)) stored in the memory 11. This allows an accurate panel surface temperature corresponding to a luminance change to be estimated for each of the areas of the liquid crystal panel 5.

The main microcomputer 8 refers to the enhanced conversion parameter changeover table depicted in FIG. 6 described above using the area-by-area panel surface temperature estimated as above, to determine the table number for the output to the enhanced converting portion 2. The processing effected by the enhanced converting portion 2 is as set forth hereinabove and hence will not again be described here.

Although the above description has been made assuming that the backlight luminance is changed by the user setting, it is natural that the present invention can be carried out in the same manner even when an active backlight technique is applied thereto that automatically changes the backlight luminance depending on the average picture level (APL) of the liquid crystal panel (screen).

Second Embodiment

Figure 10:
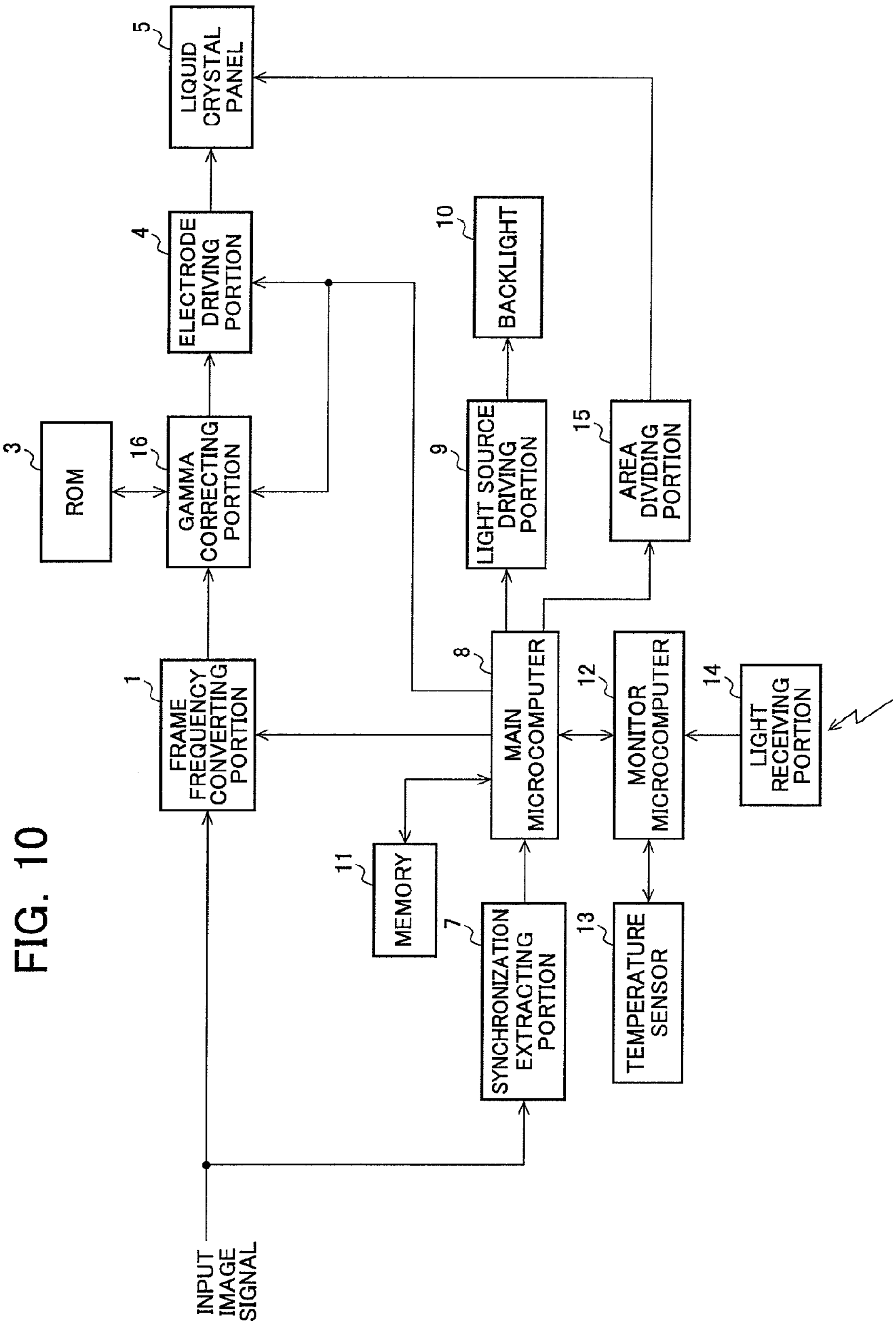
FIG. 10 is a block diagram depicting a schematic configuration example of a liquid crystal display device according to a second embodiment of the present invention.

FIG. 10 is a block diagram depicting a schematic configuration example of a liquid crystal display device according to a second embodiment of the present invention. The liquid crystal display device includes, similar to the first embodiment, the frame frequency converting portion 1, the ROM 3, the electrode driving portion 4, the liquid crystal panel 5, the synchronization extracting portion 7, the main microcomputer 8, the light source driving portion 9, the backlight 10, the memory 11, the monitor microcomputer 12, the temperature sensor 13, the light receiving portion 14, and the area dividing portion 15, with the addition of a gamma correcting portion 16. The portions designated by the same reference numerals will not again be described.

Figures 11, 12:
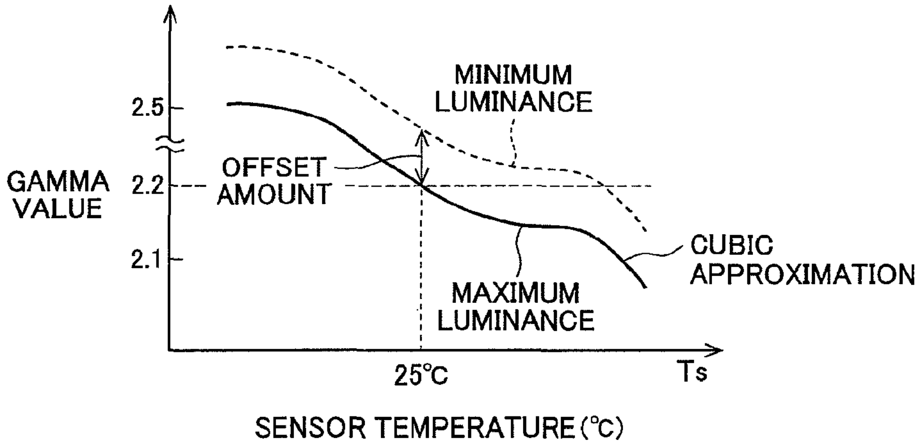
FIG. 11 is a diagram depicting an example of an LUT having conversion data for performing a gamma correction.
FIG. 12 is a diagram depicting an example of correlation data at the maximum lighting luminance between the sensor temperature detected by the temperature sensor 13 and the gamma value.

The ROM 3 stores e.g., the LUT having conversion data for gamma correcting an input image signal. An example of this LUT is depicted in FIG. 11. When gamma correcting an input image signal, the gamma correcting portion 16 refers to the LUT of FIG. 11 to thereby convert a gradation value of the input image signal and output the converted image signal to the electrode driving portion 4. At one frame cycle of the input image signal, the electrode driving portion 4 performs write scanning of the image signal.

In case of performing the gamma correction, a correction equation is given as an equation (2) below $$bra=(brb/255)^{1/\gamma}\cdot 255 \qquad \text{Eq. (2)}$$

where γ is a gamma value, brb (0-255) is a luminance value before gamma correction, bra (0-255) is a luminance value after gamma correction.

It is however inefficient to apply calculations of the above equation (2) to all the pixels, and therefore, the calculations of the equation (2) are performed in advance for the case of γ=2.2 for example and the calculation results are stored in the form of the LUT as depicted in FIG. 11 so that efficient processing is ensured. In the following description, a gamma set value is 2.2 that is previously set in the liquid crystal display device (liquid crystal panel 5).

The main microcomputer 8 outputs a control signal for controlling turning on/off of the backlight 10 to the light source driving portion 9, based on a vertical synchronizing signal extracted by the synchronization extracting portion 7. The light source driving portion 9 is configured from the FPGA (Field Programmable Gate Array) for example and performs the turning on/off of the backlight 10 in accordance with a control signal output from the main microcomputer 8.

The monitor microcomputer 12 is connected to the light receiving portion 14 that receives an operation signal from the remote control (not depicted) operated by the user and to the temperature sensor 13 such as the thermistor. The temperature sensor 13 is disposed e.g., on a circuit board within the liquid crystal display device to measure the in-device temperature. Hereinafter, the temperature measured by the temperature sensor 13 is referred to as the sensor temperature. The monitor microcomputer 12 is connected to the main microcomputer 8 to transmit the operation signal from the remote control, the sensor temperature from the temperature sensor 13, etc., to the main microcomputer 8.

The memory 11 stores correlation data depicted in FIG. 4 described above such that the main microcomputer 8 can refer to the correlation data as needed, the correlation data including the first correlation data when the backlight 10 is at its maximum lighting luminance between a temperature detected by the temperature sensor 13 and a panel surface temperature of the liquid crystal panel 5 and the second correlation data between a lighting luminance of the backlight 10 and a correction value for the panel surface temperature at the maximum lighting luminance of the liquid crystal panel 5.

The main feature of the present invention lies in that a proper gamma correction is achieved even when the panel surface temperature changes as a result of a change in the backlight lighting luminance. As a configuration for this end, the liquid crystal display device is provided with the liquid crystal panel 5 that displays an input video signal; the backlight 10 that is a light source for irradiating the liquid crystal panel 5; and a light source luminance control portion that controls the lighting luminance of the backlight 10. The light source luminance control portion is implemented by the main microcomputer 8 and the light source driving portion 9.

The liquid crystal display device is provided with the temperature sensor 13 that corresponds to a temperature detecting portion for detecting the temperature within the liquid crystal display device; the gamma correcting portion 16 that performs a gamma correction of an input video signal; and the panel temperature correcting portion that, when the lighting luminance of the backlight 10 changes, corrects a panel surface temperature of the liquid crystal panel 5 corresponding to a temperature detected by the temperature sensor 13, based on the changed lighting luminance, the gamma correcting portion 16 figuring out a gamma value corresponding to the panel surface temperature corrected by the panel temperature correcting portion and converting the gradation value of the input video signal in accordance with the gamma value figured out, for the output thereof. The panel temperature correcting portion is implemented by the main microcomputer 8.

FIG. 12 is a diagram depicting an example of correlation data at the maximum lighting luminance between the sensor temperature detected by the temperature sensor 13 and the gamma value, where the axis of ordinates represents the gamma value and the axis of abscissas represents the sensor temperature (unit: degrees). The correlation data indicated by a solid line consists of correlations (actual measurements) between the sensor temperature and the gamma value acquired when the backlight 10 is actually at the maximum lighting luminance (duty of 100%), and the correlation data can be approximated by a cubic. The liquid crystal display device of FIG. 10 is set such that the gamma value is 2.2 when the sensor temperature is 25 degrees (normal temperature) and when the lighting luminance is at its maximum. It can be seen from this correlation data that the gamma value tends to lower according as the sensor temperature rises.

The correlation data at the maximum lighting luminance depicted in FIG. 12 is stored in the ROM 3 and can be properly referred to by the gamma correcting portion 16. When there occurs a change in the sensor temperature, the gamma correcting portion 16 can refer to the correlation data of the ROM 3 to figure out a corresponding gamma value. The gamma correcting portion 16 then converts an input image signal in accordance with the gamma value figured out, to output it. The gamma correction at that time may be effected by using the equation (2) or by retaining a plurality of typical gamma value LUTs in the ROM 3 to allow an applicable LUT to be referred to.

In case that the lighting luminance of the backlight 10 is changed from its maximum to its minimum by the user setting, etc., the sensor temperature may possibly not change at once though the panel surface temperature changes instantly. It is known as described above that, when changing the backlight luminance from the maximum to the minimum, the gamma value is offset from the set value (2.2) at the same sensor temperature (25 degrees) like the correlation data indicated by a broken line of FIG. 12.

The correlation data at the maximum lighting luminance depicted in FIG. 12, however, does not allow the detection of a change in the gamma value until the sensor temperature changes. To ensure a proper gamma correction even in such a case, there is a need to estimate a panel surface temperature that depends on a change in the backlight luminance to find a correlation between this panel surface temperature and the gamma value.

In FIG. 4 described above, examples are depicted of the first correlation data indicative of a sensor temperature-panel surface temperature correlation and of the second correlation data indicative of a backlight luminance-temperature correction value correlation. FIG. 4(A) depicts an example of the first correlation data, where the axis of ordinates represents the panel surface temperature (unit: degrees) and the axis of abscissas represents the sensor temperature (unit: degrees). This first correlation data is acquired as a correlation between the sensor temperature and the panel surface temperature when the backlight 10 is actually at its maximum lighting luminance (duty of 100%) and can be approximated by a cubic in the form of a function T1=f1(Ts). For example, it can be represented by the above equation (1).

FIG. 4(B) depicts an example of the second correlation data, where the axis of abscissas represents the backlight luminance (duty ratio, unit: %) and the axis of ordinates represents the temperature correction value (the amount of change in the panel surface temperature, unit: degrees). This second correlation data is acquired as an actual correlation between the backlight luminance (duty ratio) and the correlation value for the panel surface temperature at the maximum lighting luminance and can be linearly approximated by a function ΔT=f2(B). It can be seen that with the temperature correction value 0 when the duty is 100%, the temperature correction value is linearly reduced according as the duty ratio lowers.

As set forth in FIG. 5 described above, the liquid crystal display device of this example has an item of "luminance (brightness)" as an item settable by the user operation. To facilitate the user setting, the backlight luminance is divided into 33 levels ranging from +16 (maximum luminance) to −16 (minimum luminance), the levels being correlated respectively with the backlight duties. For example, if the user designates a luminance "+14" by the remote control, etc., then "95.0%" is set as the backlight duty.

Here, for example, if the user operates the remote control, etc., to make a change from the maximum luminance +16 to a desired luminance (e.g., +14), then the panel surface temperature changes though the sensor temperature does not change, and therefore, the following method is used to estimate the panel surface temperature from the backlight duty.

In the liquid crystal display device depicted in FIG. 10 described above, when the monitor microcomputer 12 detects a change in the backlight duty caused by the user operation, it detects a sensor temperature of the temperature sensor 13. Then, the monitor microcomputer 12 transmits the detected sensor temperature to the main microcomputer 8. Since the main microcomputer 8 receives the sensor temperature periodically from the monitor microcomputer 12, it can compare a sensor temperature upon a duty change with the preceding sensor temperature to determine whether there occurs a change in the temperature. Then, the main microcomputer 8 refers to the first correlation data depicted in FIG. 4(A) based on the sensor temperature upon the duty change, to find a panel surface temperature corresponding to the sensor temperature at the duty of 100%. The panel surface temperature at that time corresponds to the panel surface temperature "A" of FIG. 5.

Next, the main microcomputer 8 refers to the second correlation data depicted in FIG. 4(B) with the luminance (+14) changed by the user, to find a temperature correction value corresponding to the backlight duty. Since the relationship between the backlight duty and the temperature correction value can be linearly approximated as depicted in FIG. 4(B), description of this example will be made on the assumption that the panel surface temperature changes by a degrees when the luminance changes one level. In the case of this example, the change is made from the luminance (+16) of duty of 100% to two-level lower luminance (+14), and hence the amount of change in the panel surface temperature proves to be "2a".

Thus, the main microcomputer 8 can estimate the panel surface temperature corresponding to the luminance (+14) of the backlight 10 as being "A−2a" degrees. Using the above function, it is given as the panel surface temperature $Tp=T_1+\Delta T=f_1(Ts)+f_2(B)$. That is, when the lighting luminance of the backlight 10 changes, the main microcomputer 8 finds a panel surface temperature at the maximum lighting luminance of the liquid crystal panel 5 corresponding to a temperature detected by the temperature sensor 13, on the basis of the first correlation data (FIG. 4(A)) stored in the memory 11 and subjects the panel surface temperature to an actual lighting luminance-based correction on the basis of the second correlation data (FIG. 4(B)) stored in the memory 11. This enables an estimation of an accurate panel surface temperature corresponding to the luminance change.

Figure 13:
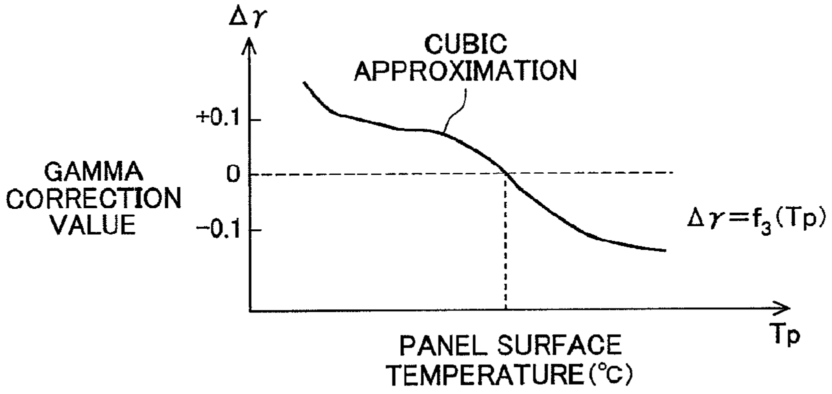
FIG. 13 is a diagram depicting an example of third correlation data indicative of a panel surface temperature-gamma correction value correlation.

FIG. 13 is a diagram depicting an example of third correlation data indicative of a panel surface temperature-gamma correction value correlation. In the diagram, the axis of abscissas represents the panel surface temperature (unit: degrees) and the axis of ordinates represents the gamma correction value (the amount of change in the gamma value). This third correlation data is given as actual correlations between the panel surface temperature at the maximum lighting luminance of the liquid crystal panel 5 and the gamma correction value for the gamma set value (2.2) previously set in the liquid crystal display device, and can be approximated by a cubic in the form of a function $\Delta\gamma=f_3(Tp)$. When no offset (change) exists with respect to the gamma set value (2.2), the gamma correction value is 0. The third correlation data is stored in the ROM 3 such that it can be properly referred to by the gamma correcting portion 16.

In FIG. 10 described above, the main microcomputer 8 sends the panel surface temperature acquired by the method of the present invention to the gamma correcting portion 16. The gamma correcting portion 16 refers to the third correlation data stored in the ROM 3, based on the panel surface temperature from the main microcomputer 8, to find a gamma correction value. The gamma correcting portion 16 then adds the acquired gamma correction value to 2.2 (gamma set value) to find a gamma value for correction. That is, the gamma correcting portion 16 estimates a panel surface temperature Tp=f1(Ts)+f2(B) from the first correlation data and the second correlation data of FIGS. 4 and 5 described above, and refers to the third correlation data of FIG. 13, based on the estimated panel surface temperature Tp, to find a gamma correction value $\Delta\gamma=f_3(Tp)$. The gamma correcting portion 16 then adds the gamma correction value Δγ to 2.2 (gamma set value) to find a gamma value γ for correction.

The gamma correction at that time may be effected by using the equation (2) for the gamma value γ for correction or by previously retaining a plurality of typical gamma value LUTs in the ROM 3 to allow an applicable LUT to be referred to.

The main microcomputer 8 may determine whether when the lighting luminance of the backlight 10 changes by the user operation there is a difference between a gamma calculation value calculated by the gamma correcting portion 16 and the gamma set value (2.2) previously set in the liquid crystal display device. If the gamma calculation value and the gamma set value differ as a result of the determination, then the control is provided such that the gamma value changes from the gamma set value to the gamma calculation value simultaneously with the change in the lighting luminance of the backlight 10. Although it is anticipated that the image quality may change abruptly since the gamma value is changed simultaneously depending on the change in the lighting luminance of the backlight 10 in this example, the change in the image quality is considered to impose less influence on the user due to the user's intentional change of the lighting luminance of the backlight 10.

It may be determined whether when the lighting luminance of the backlight 10 automatically changes depending on a change in the ambient brightness there is a difference between the gamma calculation value calculated by the gamma correcting portion 16 and the gamma set value (2.2) previously set in the liquid crystal display device. The liquid crystal display device of this example is provided with an OPC (Optic Picture Control) function not depicted and is configured to thereby detect an ambient brightness to automatically control the lighting luminance of the backlight 10 depending on the result of detection. If the gamma calculation value and the gamma set value differ as a result of the determination, then control is provided such that the gamma value gradually changes from the gamma set value to the gamma calculation value. In the case of this example, the user does not intentionally change the lighting luminance of the backlight 10, the gamma value is gradually changed so as not to impart incongruous feeling to the user as far as possible. The gamma value may be changed in either a gradual manner or a stepwise manner.

According to the present invention in this manner, a proper gamma correction can be executed not only when performing the gamma correction depending on a change in the sensor temperature but also when the panel surface temperature changes as a result of a change in the backlight lighting luminance since a gamma value depending on a change in the panel surface temperature can be figured out based on the first correlation data at the maximum lighting luminance between the sensor temperature and the panel surface temperature, the second correlation data between the backlight lighting luminance and the temperature correction value for the panel surface temperature at the maximum lighting luminance, and the third correlation data at the maximum lighting luminance between the panel surface temperature and the gamma correction value for the gamma set value (2.2).

Figure 14:
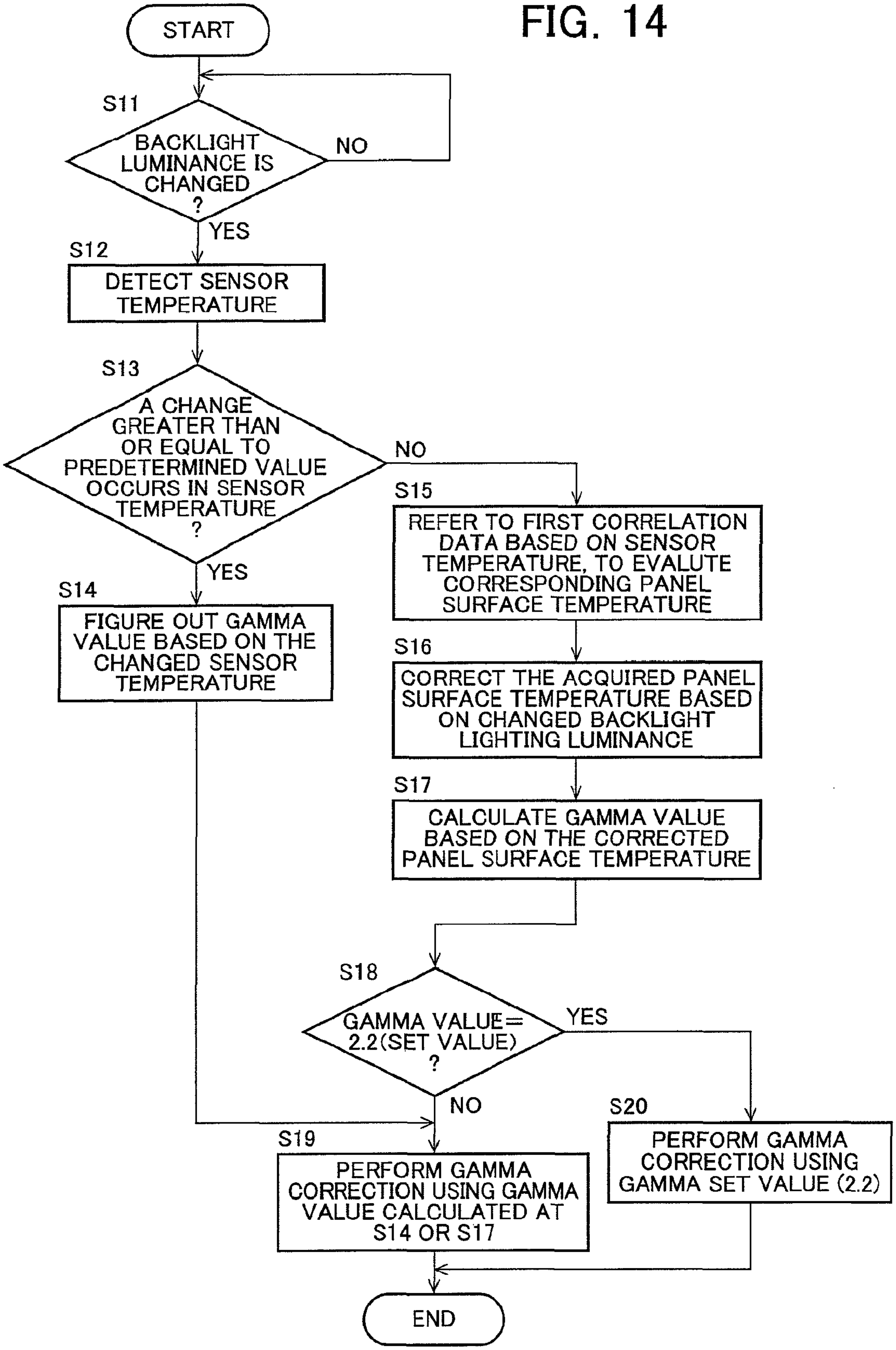
FIG. 14 is a flowchart for explaining an example of a method of performing the gamma correction by estimating a panel surface temperature from the backlight luminance by the liquid crystal display device depicted in FIG. 10.

FIG. 14 is a flowchart for explaining an example of a method of performing the gamma correction by estimating a panel surface temperature from the backlight luminance by the liquid crystal display device depicted in FIG. 10. The main microcomputer 8 first determines whether the luminance of the backlight 10 is changed by the user setting, etc. (step S11), and if it determines that the luminance of the backlight 10 is not changed (case of NO), then it goes to the standby state at step S11. If the main microcomputer 8 determines at step S11 that the luminance of the backlight 10 is changed (case of YES), then it detects a sensor temperature detected by the temperature sensor 13 (step S12).

The main microcomputer 8 then determines whether the sensor temperature changes by a predetermined value or more before and after the change in the luminance of the backlight 10 (step S13). Although this predetermined value may be properly set, it is determined in this example whether there occurs a change greater than or equal to 2 degrees. If the main microcomputer 8 determines at step S13 that there occurs a change in the sensor temperature (case of YES), then it refers to the correlation data of FIG. 12 based on the changed sensor temperature, to figure out a corresponding gamma value (step S14) to go to step S19. If the main microcomputer 8 determines at step S13 that no change occurs in the sensor temperature (case of NO), then it refers to the first correlation data (FIG. 4(A)) based on the sensor temperature, to find a corresponding panel surface temperature (step S15).

The main microcomputer 8 then refers to the second correlation data as depicted in FIG. 4(B) to correct the panel surface temperature acquired at step S15, based on the changed backlight lighting luminance (step S16). The gamma correcting portion 16 then refers to the third correlation data (ROM 3) depicted in FIG. 13, based on the corrected panel surface temperature transmitted from the main minimum 8, to calculate a gamma value corresponding to the corrected panel surface temperature (step S17) to thereafter determine whether the calculated gamma value is 2.2 (set value) (step S18).

If the gamma correcting portion 16 determines at step S18 that the gamma value calculated at step S17 is not 2.2 (case of NO), then it uses the gamma value calculated at step S17 to perform the gamma correction (step S19). If the gamma correcting portion 16 determines at step S18 that the gamma value calculated at step S17 is 2.2 (case of YES), then it uses the gamma set value (2.2) to perform the gamma correction (step S20).

A still further embodiment of the present invention will be described. Although in FIG. 4(A) described above, the backlight 10 is actually set at its maximum lighting luminance (at the backlight duty of 100%) to find the correlation between the sensor temperature and the panel surface temperature, this correlation may be acquired for each backlight duty. For example, as depicted in FIG. 8 described above, the correlation data is acquired at the backlight duty (luminance) of 100%, 90%, 80%, etc., so that a plurality of pieces of correlation data are stored in the memory 11. The luminance interval is not limited to 10% and may be properly set. If the luminance changes to 90%, the main microcomputer 8 refers to correlation data of 90% luminance to find a panel surface temperature corresponding to the sensor temperature at that time. In this manner, the method using the correlation data for each lighting luminance can also acquire a panel surface temperature that depends on a change in the backlight luminance, similar to the method using the first correlation data and the second correlation data.

In accordance with the gamma correction method set forth hereinabove, a white (W) gamma value can be adjusted depending on a change in the panel surface temperature. Since the color in the liquid crystal display device is an additive mixture of color stimuli, the luminance of white (W) is the sum of the luminances of red (R), green (G), and blue (B). The luminance ratio of R, G, and B making up W is approximately R:G:B=20:65:15. It is thus envisaged that the W gamma value is substantially equal to the G gamma value. The adjustment of the W gamma value in accordance with the above gamma correction method may disadvantageously bring about a change in the G gamma value, as a result of which the R, G, and B gamma values may shift, resulting in occurrence of a chromaticity shift.

To correct the chromaticity shift, the gamma correcting portion 16 depicted in FIG. 10 described above figures out, for each of W, R, G, and B, a gamma value corresponding to the panel surface temperature corrected by the main microcomputer 8, and, if the W gamma value is determined to be equal to the G gamma value, determines whether the gamma value of each of R and B is equal to the G gamma value. If it is determined that the gamma value of each of R and B is not equal to the G gamma value, then the gamma correcting portion 16 adjusts the gamma value of each of R and B to become equal to G gamma value. That is, if the R, G, and B gamma ratio changes, the R and B gamma values are matched up to the G gamma value. This enable the chromaticity shift to be settled without changing the W gamma value. As used herein, the term "equal" covers not only the case of completely equal but also the case of substantially equal. For the determination of the substantially equal, it may be merely determined for example whether the amount of shift between two gamma values (W gamma value and G gamma value, R gamma value and G gamma value, and B gamma value and G gamma value) lies within a predetermined range (e.g., not greater than 0.1).

Figure 15:
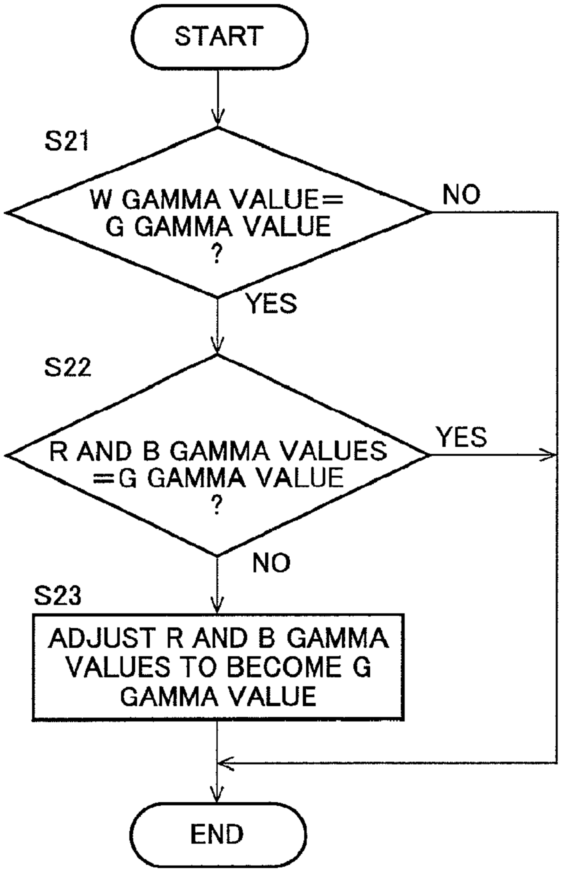
FIG. 15 is a flowchart for explaining an example of a chromaticity shift correction method according to the present invention.

FIG. 15 is a flowchart for explaining an example of a chromaticity shift correction method according to the present invention. The gamma correcting portion 16 first determines whether the W gamma value is equal to the G gamma value (step S21). If the W gamma value is equal to the G gamma value (case of YES), then the gamma correcting portion 16 determines whether the R and B gamma values are each equal to the G gamma value (step S22). If the W gamma value is not equal to the G gamma value at step S21 (case of NO), then the gamma correcting portion 16 goes directly to end without performing the chromaticity shift correction. This is for the reason that, when there is a remarkable shift between the W gamma value and the G gamma value, the luminance and chromaticity may possibly be unpreferably changed to a great extent if the R and B gamma values are changed to match up with the G gamma value. For this reason, the chromaticity shift correction is not performed when the W gamma value and the G gamma value are not equal to each other.

If the R and B gamma values are each equal to the G gamma value at step S22 (case of YES), then the gamma correcting portion 16 goes directly to end due to no need for the chromaticity shift correction. If the R and B gamma values are each not equal to the G gamma value at step S22 (case of NO), then the gamma correcting portion 16 adjusts the R and B gamma values to become the G gamma value (step S23). This achieves the chromaticity shift correction without changing the W gamma value.

A still further embodiment of the present invention will be described. Although up until now the panel surface temperature has been acquired around the substantial center of the liquid crystal panel 5, the panel surface temperature is uneven by areas of the liquid crystal panel 5. For this reason, a proper gamma correction may possibly not be effected on some areas. Thus, this embodiment divides the liquid crystal panel 5 into a plurality of areas so that the panel surface temperature is acquired for each of the areas. The panel surface temperature for each area is subjected to a correction based on the changed lighting luminance.

Figure 16:
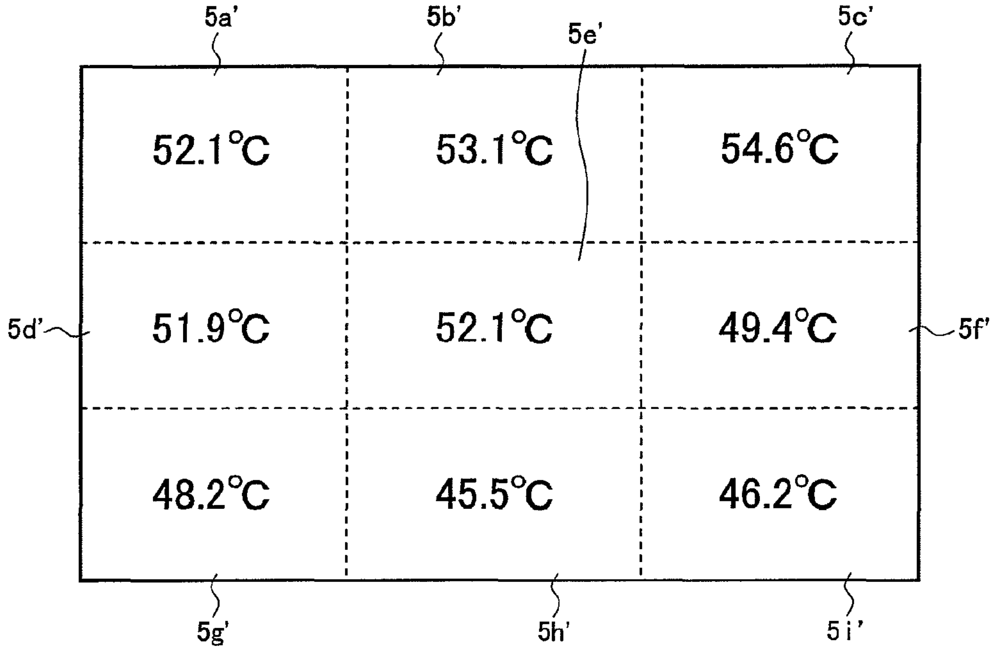
FIG. 16 is a diagram depicting an example of the distribution state of the panel surface temperature for each of the areas obtained by dividing the liquid crystal panel.

FIG. 16 is a diagram depicting an example of the distribution state of the panel surface temperature for each of the areas obtained by dividing the liquid crystal panel 5. The liquid crystal display device depicted in FIG. 10 described above is provided with the area dividing portion 15 that divides the liquid crystal panel 5 into a plurality of areas. In this example, the liquid crystal panel 5 is divided into nine areas consisting of areas 5a' to 5i', and, for each of the areas 5a' to 5i', the memory 11 stores the first correlation data depicted in FIG. 4(A) described above and the second correlation data depicted in FIG. 4(B) and the ROM 3 stores the third correlation data depicted in FIG. 13. Thus, the first correlation data and the second correlation data corresponding to the areas are prepared in advance and stored in the memory 11, while the third correlation data corresponding to the areas are prepared in advance and stored in the ROM 3.

In FIG. 10, on the basis of the first correlation data and the second correlation data, the main microcomputer 8 corrects the panel surface temperature for each of the areas obtained by dividing the liquid crystal panel 5 based on the changed lighting luminance, while the gamma correcting portion 16 calculates a gamma value for each of the areas of the liquid crystal panel 5 based on the panel surface temperature corrected by the main microcomputer 8 and converts the gradation value of the input video signal for each area in accordance with the calculated gamma value to output it. In the case where there is a change in the sensor temperature, a corresponding gamma value can be figured out from the correlation data of FIG. 12 described above. In this case, the ROM 3 may only store for each area the correlation data at the maximum lighting luminance between the sensor temperature detected by the temperature sensor 13 and the gamma value.

That is, when the monitor microcomputer 12 detects a change in the backlight duty caused by the user operation, it detects a sensor temperature of the temperature sensor 13 for each of the areas 5a' to 5i'. At that time, the temperature sensor 13 may have a less number of temperature measurement points than the number of the plurality of areas so that the sensor temperature (ambient temperature) of each area can be estimated based on the temperature at the temperature measurement points. In the case of this example, one to eight temperature measurement points may be set since the number of the areas is nine. For example, in the case where a temperature measurement point is disposed in the vicinity of the area 5e' at the panel center, the temperature at this temperature measurement point is regarded as a sensor temperature of the area 5e'. The sensor temperatures of the other areas 5a' to 5d' and 5f' to 5i' are estimated from the sensor temperature (i.e., the temperature at the temperature measurement point) of the area 5e'. Specifically, temperature differences are measured in advance between the temperatures of the areas 5a' to 5d' and 5f' to 5i' and the temperature of the area 5e' so that estimation can be made based on the temperature differences. The temperature sensor 13 may have the same number of temperature measurement points as the number of the plurality of areas so that the temperatures at the temperature measurement points can be regarded as sensor temperatures of the areas. In the case of this example, nine temperature measurement points are disposed since the number of the areas is nine. Specifically, the temperature measurement points are disposed in the vicinity of the nine areas 5a' to 5i' so that the temperatures at the temperature measurement points are regarded as the sensor temperatures of the areas 5a' to 5i'.

The monitor microcomputer 12 transmits the sensor temperatures of the areas 5a' to 5i' detected by the above to the main microcomputer 8. Due to the periodical reception of the sensor temperatures of the areas 5a' to 5i' from the monitor microcomputer 12, for each area the main microcomputer 8 can compare the sensor temperature upon a duty change with the sensor temperature immediately before the duty change and determine whether the temperature changes. For the area 5a' for example, the main microcomputer 8 refers to the first correlation data depicted in FIG. 4(A) based on the sensor temperature upon the duty change, to find a panel surface temperature corresponding to the sensor temperature at the duty of 100%. The panel surface temperature at that time corresponds to the panel surface temperature "A" in FIG. 5 described above. The panel surface temperature "A" is a value that varies depending on the sensor temperature of each area, and in the case of the example of FIG. 16, the panel surface temperature of the area 5a' is 52.1 degrees.

The main microcomputer 8 then refers to the second correlation data depicted in FIG. 4(B), for the area 5a', from the luminance (+14) changed by the user, to find a temperature correction value corresponding to the backlight duty. In the case of the example of FIG. 5, the change is made from the luminance (+16) at the duty of 100% to two-level lower luminance (+14), and hence the amount of change in the panel surface temperature turns out to be "2a". Although the amount of change "a" in the panel surface temperature indicates that the panel surface temperature changes by a degrees when the luminance changes one level, this is a value differing depending on the areas.

The main microcomputer 8 can then estimate a panel surface temperature of the area 5*a*' corresponding to the luminance (+14) of the backlight 10 as being "A−2a" degrees. The same method can apply to the estimation for the other areas 5*b*' to 5*i*'. Using the above function, the panel surface temperature for each area can be represented as $Tp=T_1+\Delta T=f_1(Ts)+f_2(B)$. When the lighting luminance of the backlight 10 changes, the main microcomputer 8 finds a panel surface temperature at the maximum lighting luminance of the liquid crystal panel 5 corresponding to a sensor temperature for each area detected by the temperature sensor 13, based on the first correlation data (FIG. 4(A)) stored in the memory 11, to correct the area-by-area panel surface temperature using the actual lighting luminance, based on the area-by-area second correlation data (FIG. 4(B)) stored in the memory 11. This allows an accurate panel surface temperature corresponding to a luminance change to be estimated for each of the areas of the liquid crystal panel 5.

The gamma correcting portion 16 refers to the third correlation data depicted in FIG. 13 described above by the panel surface temperature for each area estimated as the above, to find a corresponding gamma correction value (Δγ) for each of the areas. The gamma correcting portion 16 then adds the gamma correction value (Δγ) to 2.2 (gamma set value) so that a gamma value γ for correction can be acquired for each of the areas.

The chromaticity shift correction method described in FIG. 15 may be executed for each of the areas. Specifically, the gamma correcting portion 16 figures out, on an area-by-area basis for each of W, R, G, and B, a gamma value corresponding to the panel surface temperature corrected by the main microcomputer 8, and, if it is determined that the W gamma value is equal to the G gamma value, determines for each area whether the R and B gamma values are each equal to the G gamma value. If it is determined that each of the R and B gamma values is not equal to the G gamma value, then the gamma correcting portion 16 adjusts, for each area, each of the R and B gamma values so as to become equal to the G gamma value.

Although the above description has been made assuming that the backlight luminance is changed by the user setting, it is natural that the present invention can be carried out in the same manner even when an active backlight technique is applied thereto that automatically changes the backlight luminance depending on the average picture level (APL) of the liquid crystal panel (screen).

EXPLANATIONS OF LETTERS OR NUMERALS

1 . . . frame frequency converting portion; 2 . . . enhanced converting portion; 3 . . . ROM; 4 . . . electrode driving portion; 5 . . . liquid crystal panel; 6 . . . frame memory; 7 . . . synchronization extracting portion; 8 . . . main microcomputer; 9 . . . light source driving portion; 10 . . . backlight; 11 . . . memory; 12 . . . monitor microcomputer; 13 . . . temperature sensor; 14 . . . light receiving portion; 15 . . . area dividing portion; 16 . . . gamma correcting portion; 101 . . . LED substrate; 102 . . . LED; 103, 104 . . . harness; and 105, 106 . . . connector.

The invention claimed is:

1. A liquid crystal display device having a liquid crystal panel displaying an input video signal, a light source illuminating the liquid crystal panel, and a light source luminance control portion controlling a lighting luminance of the light source, the liquid crystal display device comprising:

a temperature detecting portion that detects a temperature within the liquid crystal display device;

an enhanced converting portion that evaluates an enhanced conversion parameter for compensating the optical response characteristic of the liquid crystal panel, to output an applied voltage signal to the liquid crystal panel based on the enhanced conversion parameter; and a panel temperature correcting portion that, when the lighting luminance of the light source changes, corrects a panel surface temperature of the liquid crystal panel corresponding to a temperature detected by the temperature detecting portion, based on the changed lighting luminance;

the enhanced converting portion variably controlling the enhanced conversion parameter based on the panel surface temperature corrected by the panel temperature correcting portion.

2. The liquid crystal display device as defined in claim 1, comprising a memory that stores first correlation data between the temperature detected by the temperature detecting portion when the light source is at its maximum lighting luminance and the panel surface temperature of the liquid crystal panel and second correlation data between the lighting luminance of the light source and a correction value for the panel surface temperature at the maximum lighting luminance of the liquid crystal panel, wherein when the lighting luminance of the light source changes, the panel temperature correcting portion evaluates, based on the first correlation data, a panel surface temperature at the maximum lighting luminance of the liquid crystal panel corresponding to the temperature detected by the temperature detecting portion, a correction of the panel surface temperature depending on the lighting luminance is carried out based on the second correlation data.

3. The liquid crystal display device as defined in claim 1, comprising a memory that stores, for each lighting luminance of the light source, correlation data between the temperature detected by the temperature detecting portion and the panel surface temperature of the liquid crystal panel, wherein when the lighting luminance of the light source changes, the panel temperature correcting portion corrects a panel surface temperature of the liquid crystal panel corresponding to the temperature detected by the temperature detecting portion, based on the correlation data.

4. The liquid crystal display device as defined in claim 1, wherein the panel temperature correcting portion performs the correction if it is determined when the lighting luminance of the light source changes that the temperature detected by the temperature detecting portion does not change.

5. The liquid crystal display device as defined in claim 1, comprising an area dividing portion that divides the liquid crystal panel into a plurality of areas, wherein the panel temperature correcting portion corrects the panel surface temperature for each of the areas obtained by dividing the liquid crystal panel, based on the changed lighting luminance, and wherein the enhanced converting portion variably controls the enhanced conversion parameter for each area of the liquid crystal panel, based on the panel surface temperature corrected by the panel temperature correcting portion.

6. The liquid crystal display device as defined in claim 5, wherein the temperature detecting portion has a less number of temperature measurement points than the number of the plurality of areas and estimates an ambient temperature of each area based on the temperatures at the temperature measurement points.

7. The liquid crystal display device as defined in claim 5, wherein the temperature detecting portion has the same number of temperature measurement points as the number of the plurality of areas and regards the temperatures at the temperature measurement points as ambient temperatures of the areas.

* * * * *